US007450627B2

(12) United States Patent
Couch et al.

(10) Patent No.: US 7,450,627 B2
(45) Date of Patent: Nov. 11, 2008

(54) WIRELESS COMMUNICATION SYNCHRONIZATION

(75) Inventors: Philip R. Couch, Honiton (GB); Alexander M. Barry, Winterville, NC (US); Robert M. Harman, Troutville, VA (US)

(73) Assignee: FB iMonitoring, Inc., Roanoke, VA (US)

( * ) Notice: Subject to any disclaimer, the term of this patent is extended or adjusted under 35 U.S.C. 154(b) by 0 days.

(21) Appl. No.: 11/292,792

(22) Filed: Dec. 1, 2005

(65) Prior Publication Data

US 2006/0140208 A1 Jun. 29, 2006

Related U.S. Application Data

(60) Provisional application No. 60/632,898, filed on Dec. 2, 2004.

(51) Int. Cl.
*H04B 1/00* (2006.01)
(52) U.S. Cl. .................................. 375/132; 340/539.22
(58) Field of Classification Search ......... 375/132–136, 375/367; 370/431, 437, 471, 474, 475, 503; 340/539.1, 539.22–539.29
See application file for complete search history.

(56) References Cited

U.S. PATENT DOCUMENTS 4,554,668 A * 11/1985 Deman et al. ............... 375/133
4,850,036 A * 7/1989 Smith ......................... 455/502
4,872,205 A * 10/1989 Smith ......................... 455/527
5,079,768 A * 1/1992 Flammer ..................... 370/349
5,130,987 A * 7/1992 Flammer ..................... 370/436
5,659,303 A * 8/1997 Adair, Jr. ................ 340/870.18
6,058,137 A * 5/2000 Partyka ....................... 375/131
6,188,715 B1 * 2/2001 Partyka ....................... 375/134
6,535,544 B1 * 3/2003 Partyka ....................... 375/132
7,103,511 B2 * 9/2006 Petite ........................... 702/188
2002/0141479 A1 * 10/2002 Garcia-Luna-Aceves et al. . 375/132

* cited by examiner

*Primary Examiner*—Jean B Corrielus
(74) *Attorney, Agent, or Firm*—Mueller Smith

(57) ABSTRACT

A method of communicating among wireless devices includes providing a frequency hopping schedule to a target device. The frequency hopping schedule includes a sequence of frequencies. The method also includes, at the target device, alternately sleeping and listening on a frequency in the sequence of frequencies according to the frequency hopping schedule, exchanging time base information between the target device and the transmitting device, at the transmitting device, using the time base information to determine a current frequency of the target device, from the transmitting device, and transmitting a packet of information uniquely addressed to the target device.

18 Claims, 16 Drawing Sheets

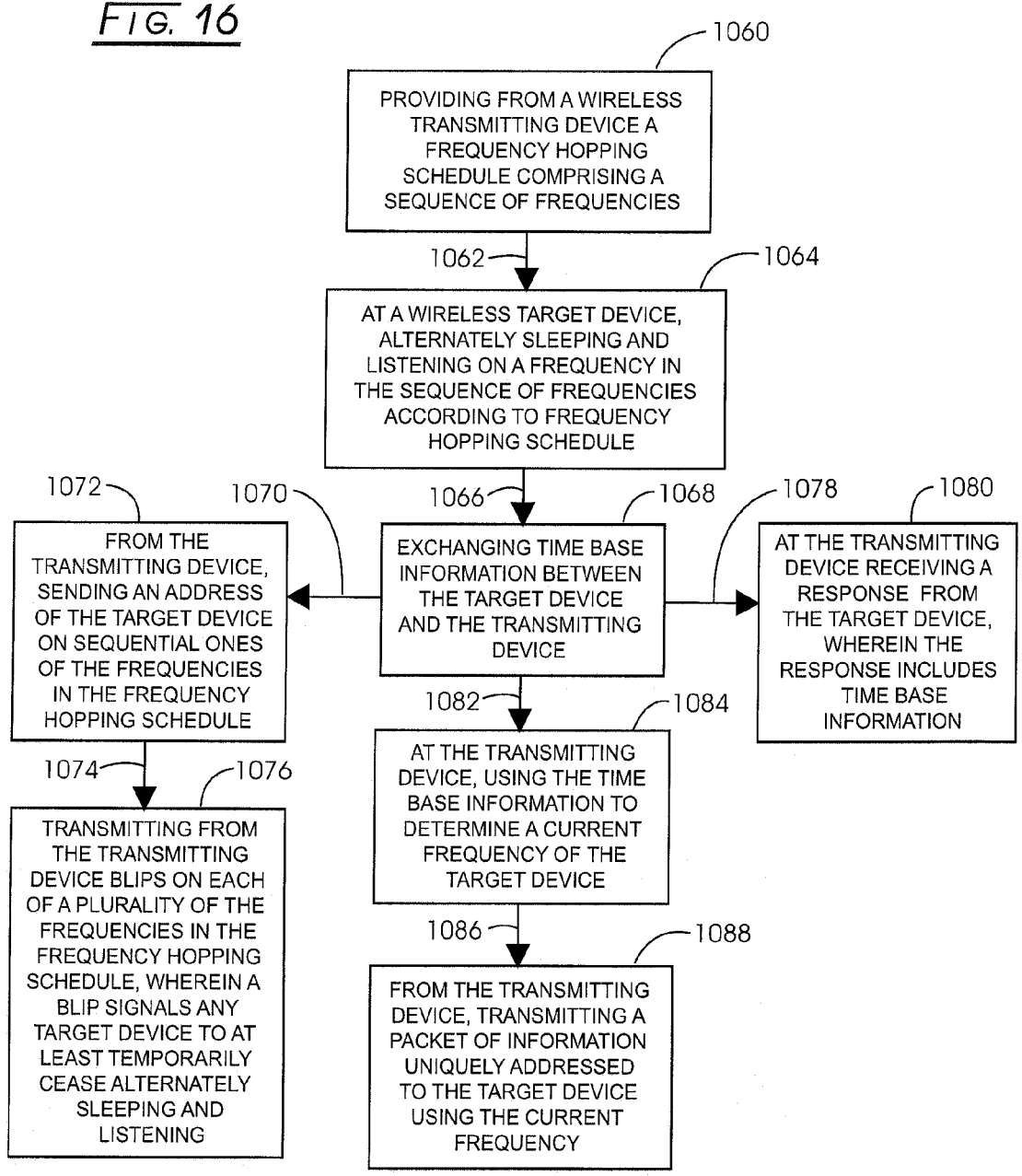

WIRELESS COMMUNICATION SYNCHRONIZATION

CROSS-REFERENCES TO RELATED APPLICATIONS

This application is a non-provisional of, and claims the benefit of, co-pending, commonly-assigned, Provisional U.S. patent application No. 60/632,898, entitled "WIRELESS COMMUNICATION SYNCHRONIZATION," filed on Dec. 2, 2004, by Couch, et al., the entirety of which application is incorporated herein for all purposes.

This application is related to U.S. patent application Ser. No. 11/292,791 entitled "FIELD SENSING NETWORK," filed on Dec. 1, 2005, which is a non-provisional of and claims the benefit of Provisional U.S. Patent Application No. 60/632,773, entitled "WIRELESS FIELD SENSING NETWORK," filed on Dec. 2, 2004, which applications are incorporated herein in their entirety for all purposes.

Embodiments of the present invention relate generally to monitoring systems. More specifically, embodiments of the invention relate to communication protocols among devices in a monitoring network.

BACKGROUND OF THE INVENTION

Industrial complexes often require a variety of parameters to be measured and analyzed. This promotes safety, security, efficiency, and a number of other desirable features. The more efficiently the parameters are measured, the more efficient the complex operates, generally.

Many complexes are distributed over vast distances. Many locations that require monitoring have limited access to power and communications infrastructure. In many applications, monitoring systems must be inexpensive to be cost effective. Hence, for these and other reasons, it is desirable to have inexpensive field sensors and a cost effective network of such sensors.

BRIEF SUMMARY OF THE INVENTION

Embodiments of the invention provide a method of communicating among wireless devices. The method includes providing a frequency hopping schedule to a target device. The frequency hopping schedule includes a sequence of frequencies. The method also includes, at the target device, alternately sleeping and listening on a frequency in the sequence of frequencies according to the frequency hopping schedule, exchanging time base information between the target device and the transmitting device, at the transmitting device, using the time base information to determine a current frequency of the target device, from the transmitting device, and transmitting a packet of information uniquely addressed to the target device. Exchanging time base information between the target device and the transmitting device may include, from the transmitting device, sending an address of the target device on sequential ones of the frequencies in the frequency hopping schedule and at the transmitting device, receiving a response from the target device. The response may include the time base information. Exchanging time base information between the target device and the transmitting device also may include transmitting blips on each of a plurality of the frequencies in the frequency hopping schedule. A blip signals any target device to at least temporarily cease alternately sleeping and listening.

The transmitting device and the target device may be comprised by an industrial sensing network. The target device may be a wireless, self-powered, sensing device. The packet of information uniquely addressed to the target device may be at least a portion of an instruction for the sensing device to report sensing information. The sensing device may be a selection from a group consisting of temperature sensor, pressure sensor, and vibration sensor. The sequence of frequencies may be 53 channels in a range of frequencies from about 902 MHz to about 928 MHz.

Other embodiments provide a wireless sensing device. The device includes a self-contained power source, a bidirectional radio, a sensor, and a control system. The control system may be programmed to cause the sensing device to receive a frequency hoping schedule. The frequency hopping schedule may be a sequence of frequencies over which the radio is configured to communicate. The control system also may be programmed to alternately sleep and listen on a frequency in the sequence of frequencies according to the frequency hopping schedule, respond to a blip on a given frequency by at least temporarily ceasing alternately sleeping and listening, receive a uniquely addressed transmission from a transmitting device, and respond to the uniquely addressed transmission with an acknowledgement transmission. The acknowledgement transmission includes time base information. The control system also may be programmed to receive a packet of uniquely-addressed information on a frequency determined, at least in part, by the time base information and the frequency hoping schedule.

The device may be part of an industrial sensing network. The device may be a selection from a group consisting of temperature sensor, pressure sensor, and vibration sensor. The packet of uniquely-addressed information may be at least a portion of an instruction for the device to report sensing information. The sequence of frequencies may be 53 channels in a range of frequencies from about 902 MHz to about 928 MHz.

Still other embodiments provide a wireless field sensing network. The network includes at least one transmitting device and at least one target device. The at least one target device is configured to receive a frequency hopping schedule. The frequency hopping schedule is a sequence of frequencies over which the radio is configured to communicate. The at least one target device is also configured to alternately sleep and listen on a frequency in the sequence of frequencies according to the frequency hopping schedule, respond to a blip from a transmitting device on a given frequency by at least temporarily ceasing alternately sleeping and listening, receive a uniquely addressed transmission from the transmitting device, and respond to the uniquely addressed transmission with an acknowledgement transmission. The acknowledgement transmission includes time base information. The at least one target device is also configured to receive a packet of uniquely-addressed information on a frequency determined, at least in part, by the time base information and the frequency hopping schedule. The target device may be a temperature sensor, pressure sensor, vibration sensor, or the like. The packet of uniquely-addressed information may be at least a portion of an instruction for the target device to report sensing information to the transmitting device. The sequence of frequencies may be 53 channels in a range of frequencies from about 902 MHz to about 928 MHz. The field sensing network may be an industrial sensing network.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 16 is a flow chart showing a method of communicating among wireless devices.

DETAILED DESCRIPTION OF THE INVENTION

Figure 1:
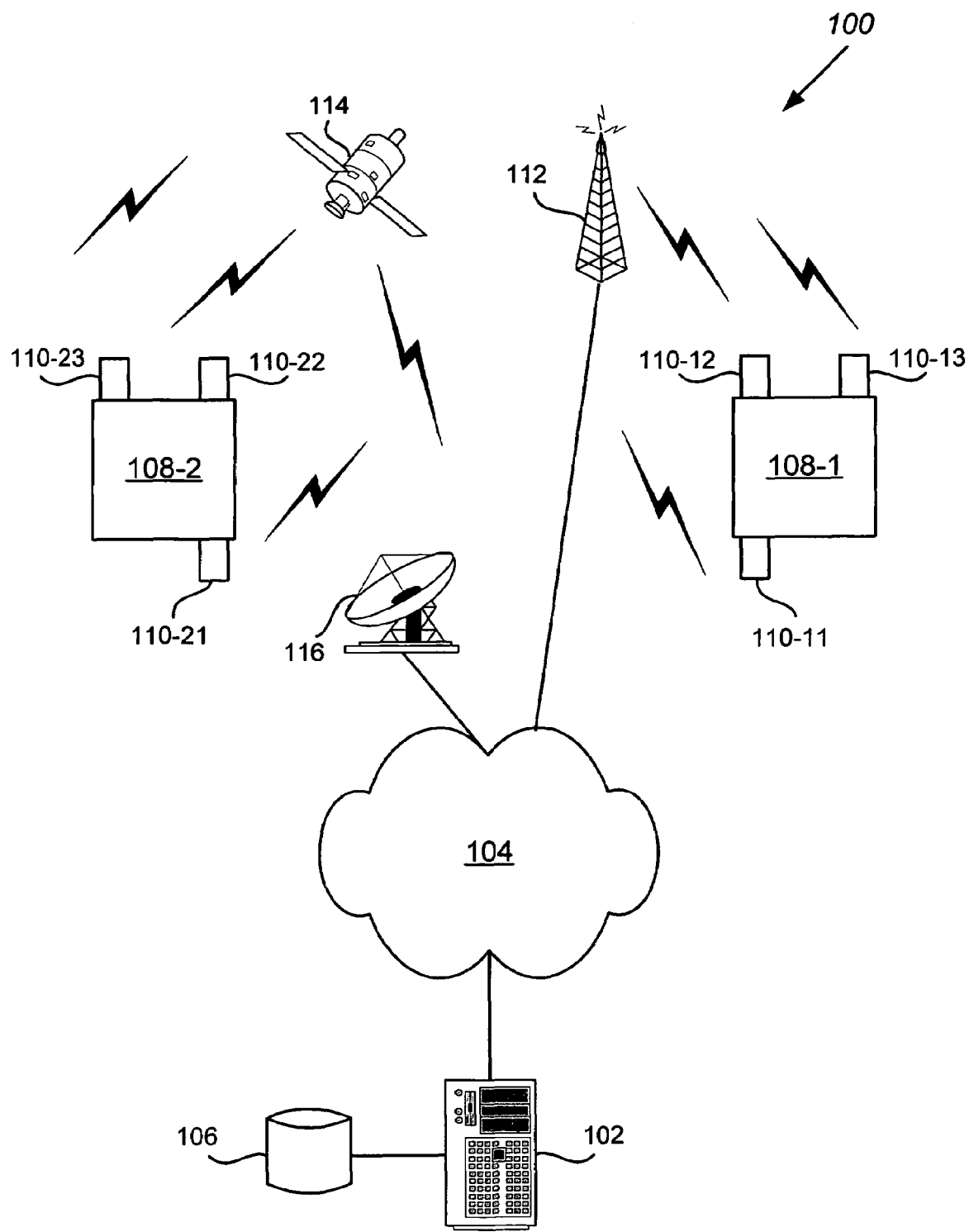
FIG. 1 provides a first exemplary distributed monitoring system according to embodiments of the invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

FIG. 1 illustrates a distributed monitoring system 100 according to embodiments of the invention. Those skilled in the art will appreciate that the system 100 is merely exemplary of a number of possible systems according to embodiments of the invention. The system 100 may be distributed across a vast geographical area or may be locate within a single facility. The system includes a data processing server 102 and a network 104 through which data are collected. The system 100 also includes a database for housing data. The data processing server 102 may be any of a variety of well-know computing devices, including, for example, a server, a workstation, a personal computer, a mainframe, and/or the like. The network 104 may be a Wide Area Network, a Local Area Network, the Internet, and/or any of a number of other types and varieties of networks, as is apparent to those skilled in the art. The database 106 may be nay of a variety of storage systems, including, for example, magnetic, optical, solid state, and/or the like.

The system 100 includes two monitored devices 108, although other exemplary systems include may additional monitored devices. The monitored devices 108 may be, for example, tanks, piping systems, processing systems, fluid and gas systems, electrical systems, and/or the like. Sensors 10 are placed at various points on the monitored devices 108 to collect, and in some cases process, data. As will be explained in more detail hereinafter, the sensors may be, for example, temperature sensors, pressure sensors, vibration sensors, and/or the like.

The sensors 110 transmit data to the processing server 102 through any of a variety of paths. For example, the sensors 110-1 transmit information via a generally terrestrial path. Signals from the sensors 110-1 are transmitted via a land-based receiving tower 112 that may be hard wired to the network 104, although retransmitting wireless signals is also a possibility. The sensors 110-2 transmit signals to a satellite 114 that retransmits the signals to a ground-based receiver 116. Those skilled in the art will appreciate many such examples in light of the disclosure herein.

The signaling of the system 100 may follow any of a variety of protocols. For example, the sensors 110 may be polled periodically by the data processing server 102. When a sensor 110 is interrogated, it responds with either real-time or stored data. In some embodiments, the data is a compilation of processed data, while in other embodiments, the sensor 110 transmits raw data. In some embodiments, sensors are configured to transmit upon the detection of an upset condition or upon the occurrence of any of a number of predetermined events. In still other embodiments, the sensors 110 transmit data according to a predetermined schedule. Although impractical, some sensors may be configured to transmit continuously. In any of the foregoing, handshaking may be employed to ensure data are received. Many other examples exist, including combinations of the foregoing.

As previously stated, some sensors 110 may do some level of pre-processing. Such sensors have the advantage of low power utilization, since data transmission is typically the highest power consumption function the sensors perform. This will be described in greater detail hereinafter.

Figure 2:
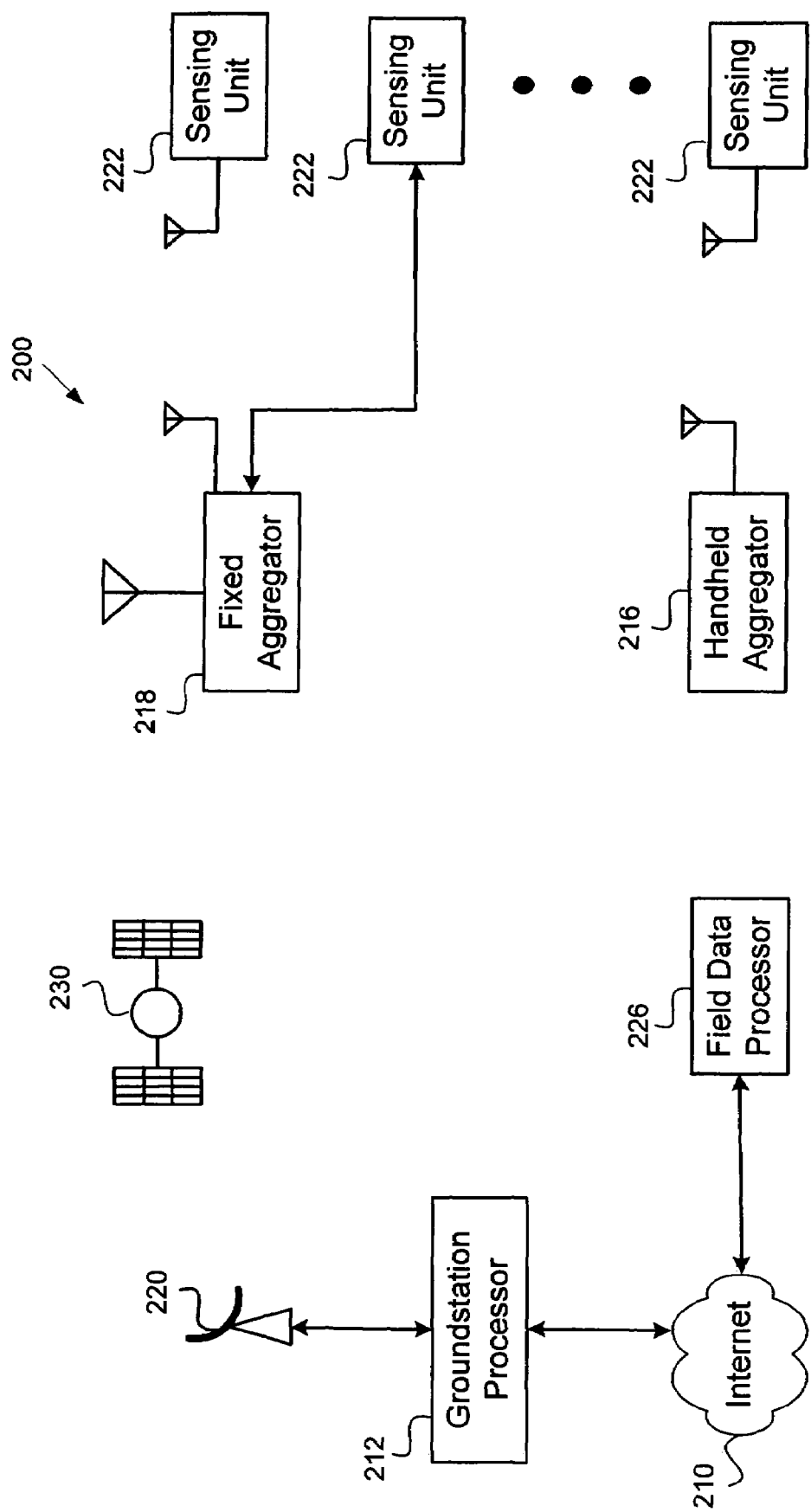
FIG. 2 provides a second exemplary distributed monitoring system according to embodiments of the invention.

Referring to FIG. 2, a second exemplary distributed sensing network 200 is shown. In this embodiment, sensors 222 are positioned to monitor various field-deployed equipment and facilities. The sensors 222 are in bidirectional communication with one or more aggregators 216, 218 either wired or wirelessly. The aggregator 218 is a fixed aggregator, which collects data from the sensing units 222 and relays the data to a ground station processor 212 via a satellite 230 and satellite antenna (downlink) 220. The aggregator 218, or communication concentration unit, may act as a node to relay communication wirelessly or wired between sensing units 222. Although not shown, the satellite 230 can be coupled to any number of fixed aggregators 218 in various geographic regions. Some embodiments could have multiple satellites 230 with multiple groundstation processors 212.

Occasionally, a handheld aggregator 216 is used to gather information from the sensing units 222. The communication can be wired, optical, wireless, or any mixture of these. In this embodiment, there are two or more sensing units 222 per aggregator 216, 218, but some embodiments could have a single sensing unit 222 for an aggregator 216, 218. Where there is only one sensing unit 222 for a fixed aggregator 218, the fixed aggregator 218 acts as a repeater and bridge from the LAN to the WAN. Various testing approvals may be obtained for the fixed aggregator 218 and sensing units 222. In this embodiment, the sensing units 222 are intrinsically safe rated by Underwriter Laboratories™, but could be tested to an explosion proof rating in other embodiments.

Each field location can integrate into the distributed sensing network 200 of other field locations to perform distributed sensing and computing. Every field location with a WAN radio sends a proprietary packet of information to the groundstation processor 212 that encapsulates the proprietary packet into an XML file. All the gathered data from the many field locations is aggregated in a field data processor 226 by downloading the various XML formatted data messages over the Internet 210 from a file transfer protocol (FTP) site of the groundstation processor 212. The field data processor 226 stored the gathered information in a database and could perform further data processing.

Each sensing unit 222 is configured by the system 200. Configuring includes sensing frequency, alarm configuration, calibration, reporting frequency, data analysis and processing parameters and firmware updates. Alarm situations could configure a sensor threshold that triggers a radio report being made, for example. High, low, change type thresholds can be programmed into each sensing unit 212. Should a threshold be met in frequent sensor readings, it would be reported over the LAN radio and possibly forwarded on by the aggregator 218 with the WAN radio.

In one embodiment, the sensing unit 222 stops listening for an incoming transmission to wake it when the battery becomes low. Alarms are still monitored if power permits. When an alarm is triggered, a transmission is made to report the alarm condition. If there is no energy to report the alarm condition, the alarm will be reported when adequate power is later achieved. For example, if an alarm occurs in the middle of the night and the battery is almost dead, the alarm will be stored until daybreak provides sufficient solar energy to make a transmission.

The output of the sensor in the sensing unit 222 can be recorded and/or processed in the field. Processing can reduce the bandwidth required for sending the processed data over a WAN connection to the field data processor 226. More power is consumed transmitting a large amount of data than to process the data into a result that is transmitted. In a given deployment, an aggregator 216, 218 can support 16 or less, 32 or less, 64 or less, 128 or less, 256 or less, 512 or less sensing units 222 wirelessly connected to the aggregator 216, 218. With more frequent sensor sample reporting rates, the number of sensing units 222 supported is generally less.

This embodiment has both a fixed aggregator 218 and a handheld aggregator 216, but some embodiments only have one or the other. The fixed aggregator 218 is mounted in a location to allow one- or two-way communication with the sensing units 222. The fixed aggregator 218 can communicate with other fixed and handheld aggregators 218, 216. Some fixed aggregators 218 do not directly communicate with the satellite 230, but communicate in a peer-to-peer fashion with an aggregator 218 that can. With the peer-to-peer protocol, a sensing unit 222 can push new data to the aggregator 216, 218 or the aggregator 216, 218 can request a sensor reading. In some embodiments, the handheld aggregator 216 does not accept data pushed to it and only request information from fixed aggregators 218 and sensing units 222. Other embodiments could communicate in a mesh fashion.

The handheld and/or mobile aggregator 216 can send commands to and receive information from the sensing units 222 and fixed aggregators 218 in an off-line fashion. The handheld aggregator 216 can be used in calibrating any sensing units 222, but some sensing units 222 can be automatically calibrated by internal firmware. Commands are loaded onto the handheld aggregator 216 before the handheld aggregator 216 is transported to the field. Field data gathered by the handheld aggregator 216 is hand-delivered to a station that is locally or remotely coupled to the field data processor 226. The mobile aggregator 216 can be carried by a field engineer to a well site to automatically gather sensor information.

When communicating to sensing units 222, the aggregator 216, 218 can communicate directly with the sensing unit 222 or communicate with another aggregator 216, 218 within range of the sensing unit 222. An aggregator 216, 218 can relay any request for data to the appropriate sensing unit 222. In some embodiments, the handheld aggregator 216 does not accept unsolicited incoming communication so would not relay requests from other aggregators 216, 218.

Visual inspections of the equipment may be performed by the field engineer during the visit. Problem histories or specific visual checks can be noted in the mobile aggregator 216 to assist the field engineer. Maintenance history or maintenance checklists can also be included on the mobile aggregator.

A satellite antenna 220 is used to couple the groundstation processor 212 to the satellite 230. Other embodiments could use any WAN connection, for example, microwave, cellular modem, fiber optic cable, radio, or wired modem. The fixed aggregator 218 could have the device providing the WAN connection external to the fixed aggregator 218. The fixed aggregator 218 can store up data for a period of time to allow a burst communication according to a periodic schedule or whenever the data is gathered.

Figure 11:
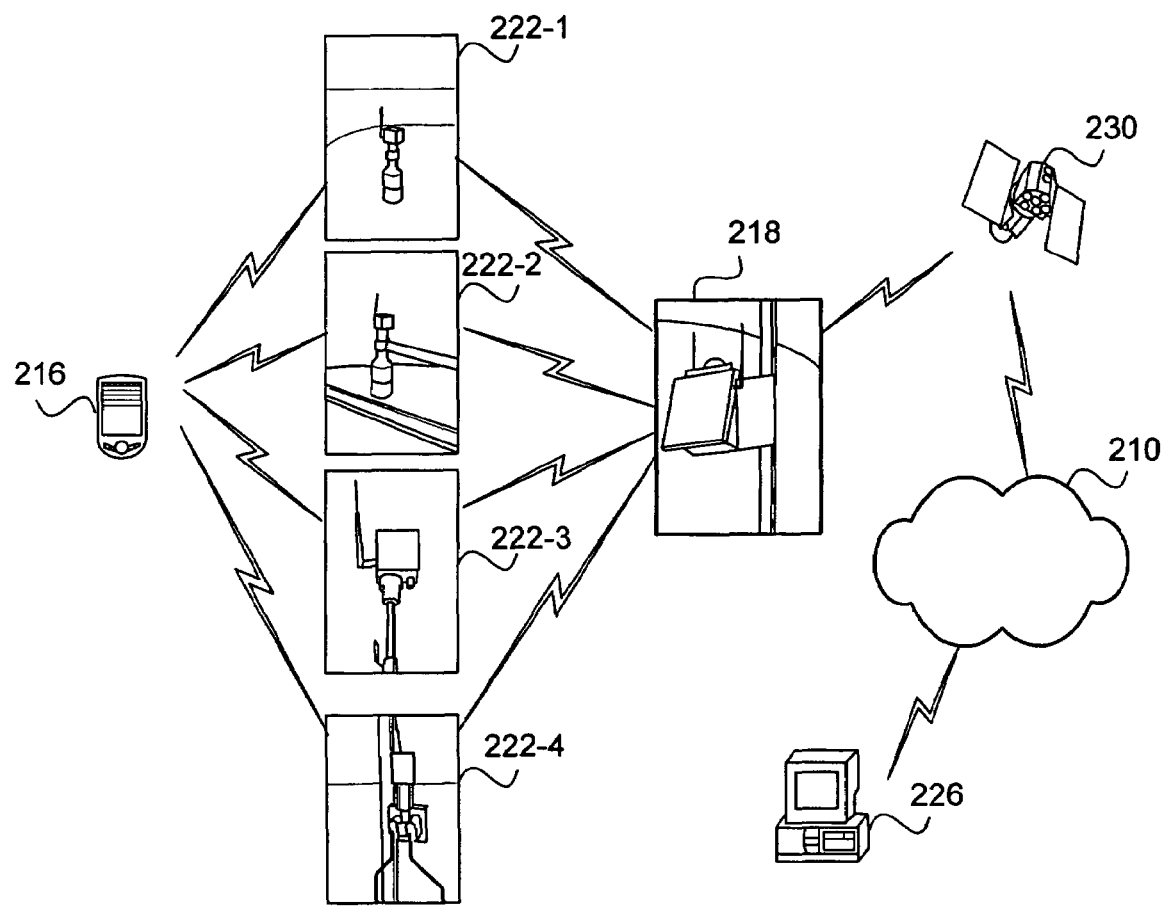
FIG. 11 provides a third exemplary distributed monitoring system according to embodiments of the invention.

FIG. 11 illustrates an additional exemplary sensing network according to embodiments of the invention. In this embodiment, like reference numbers refer to like elements. This embodiment includes a oil tank level monitor 222-1, a water tank level monitor 222-2, a pressure monitor 222-3, and a flow meter 222-4.

Figure 12:
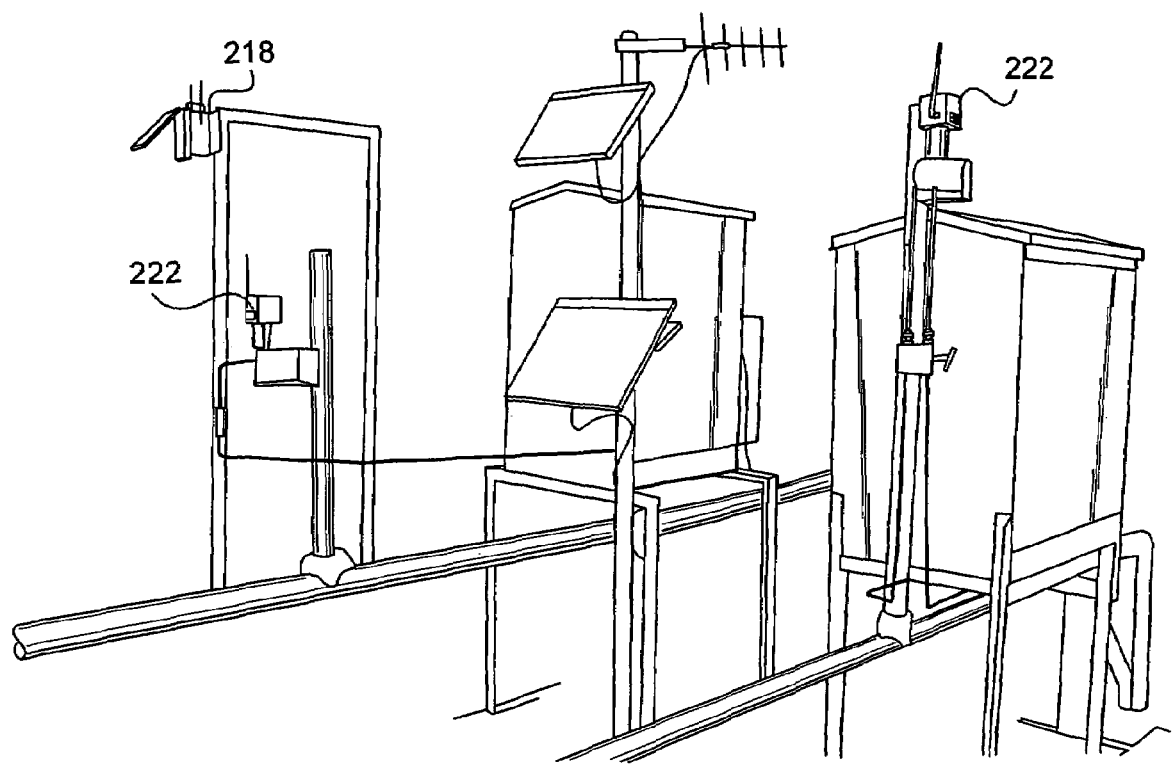
FIG. 12 provides a perspective view of sensing units deployed to monitor equipment.

FIG. 12 illustrates sensors 222 deployed to monitor industrial equipment. A fixed aggregator 218 is deployed to collect information from the sensors 222 and relay the information to a remote receiver.

Figure 3:
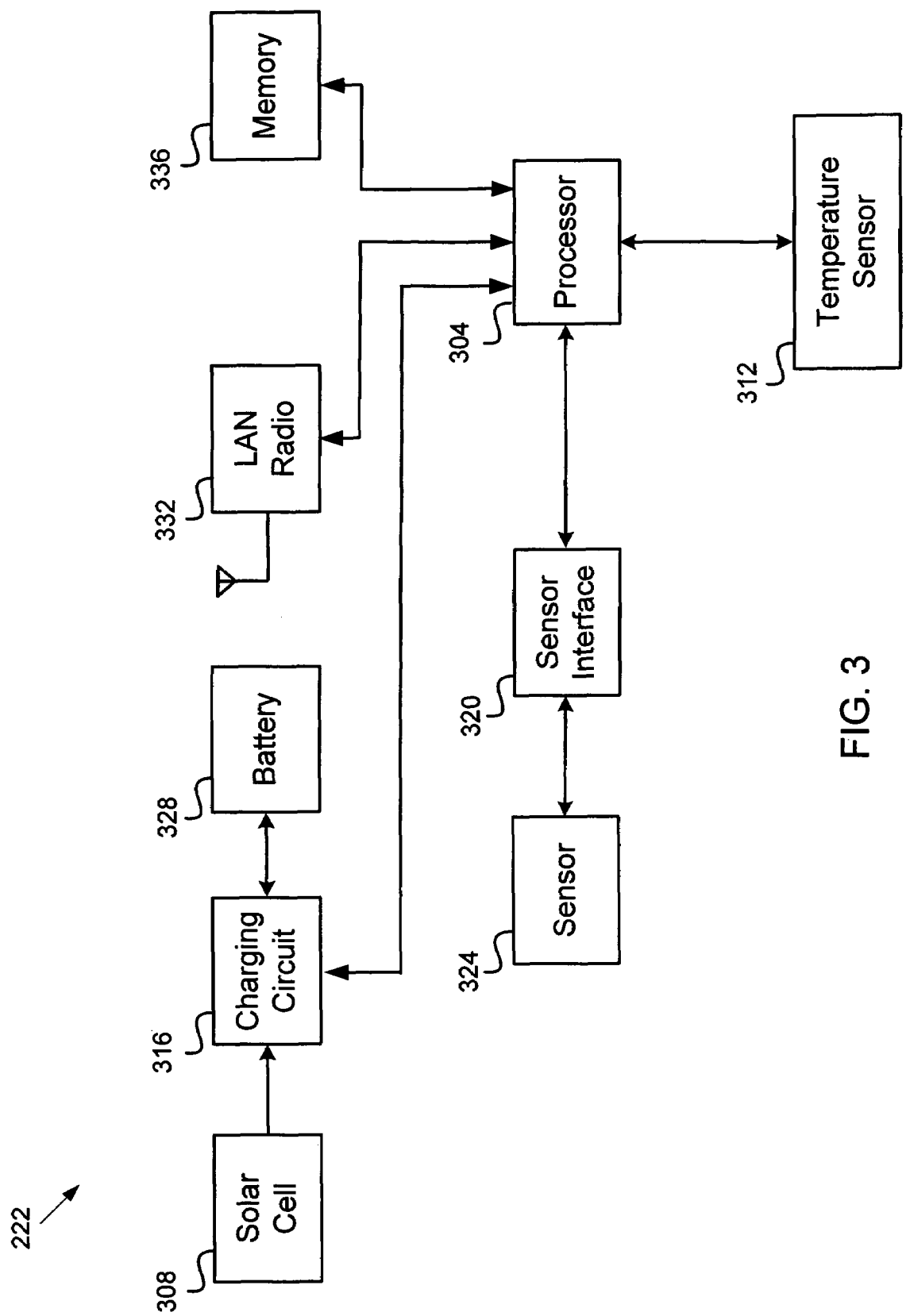
FIG. 3 provides a schematic diagram of a sensing unit according to embodiments of the invention.

Referring next to FIG. 3, an embodiment of a sensing unit 222 is shown. The sensing unit 222 is implemented in one enclosure that includes a LAN radio 332, integral power using a battery 328 or capacitor and a solar cell 308, a sensor 324 and/or sensor interface 320 coupled to an external sensor 324, and a memory 236 for storage capability. The sensing unit 222 is small enough to only displace 10 cubic inches or less of volume.

Some embodiments of the sensing unit 222 could control operation of a piece of equipment. For example, a sensing unit 222 with a pressure sensor could control a pipeline valve to close the valve when excessive pressure it detected. The current valve setting could be reported using the LAN radio 332. In another example, the action of a beam pump is monitored with an accelerometer and the sensing unit 222 can increase or decrease the speed of the beam pump in response to production measured in the same sensing unit 222 or another sensing unit 222.

In the depicted embodiment, the LAN radio uses a 902-928 MHz frequency and frequency-hopping in an unlicensed band. Any one of the aggregators 216, 218 or sensing units 222 can be a master or a slave in the wireless communication process such that all LAN radios can operate in a peer-to-peer fashion. In this embodiment, the LAN radio 332 uses the processor, but in other embodiments the LAN radio 332 could have a separate and dedicated processor.

The processor 304 choreographs operation of the sensing unit 222. Gathering sensor information, configuring the sensor, processing sensor information, controlling the charging circuit 316, and radio communication are all managed by the processor 304 to some extent. In this embodiment, the processor 304 has 4 MIPS or less of processing power, but other processors 304 could have different architectures with higher instruction rates and/or higher clock rates. The memory 336 is 1 MB in this embodiment for storage of data, but could be larger or smaller in other embodiments (e.g., a memory to store 30 days, 60 days, one year of one minute, one hour or one day sensor samples, each having a 16-64 Byte size). A history of sensor readings can be stored in the memory 336 and recalled by any querying device 216, 218, 222.

The power system for the sensing unit 222 is comprised of a solar cell 308, a charging circuit 316 and a battery 328. Some embodiments could use a capacitor to store power if wider temperature swings are expected (e.g., a −40° C. to 60° C. or worse temperature range). The battery 328 in this embodiment is a LiIon battery 328. The battery 328 can run for several weeks without any sunlight for the solar cell 308 in one embodiment, but this varies as does the radio activity and sensor sampling. For example, for samples taken every day and sent as a 16-64 byte value over the LAN radio, the charged battery 328 alone can power the sensing unit 222 for 30, 60 or 200 days in various embodiments. In another example, with hourly samples/radio reports and readings/alarm checks every minute, the battery 328 can last several days without any incident sun.

In one embodiment, the battery 328 is charged differently based upon environmental temperature. A temperature sensor 312 thermally coupled to the battery 328 is read by the processor 304 to allow programming the charging circuit 316 accordingly. For example, when the temperature is below 0° C. the charging circuit 316 would limit the charge rate or prevent charging altogether. When the battery 328 is too hot, the charging circuit can be programmed to charge the battery 328 at a lower voltage to preserve the life of the cells. Other embodiments could have various voltage and current controls that are affected by the temperature sensor 312.

Even without a battery 328 or when the battery 328 dies, the solar cell 308 can still provide adequate power during daylight hours. The solar panel 308 supplies about 30 mA when exposed to sunlight, but other embodiments could use a higher or lower power solar cell 308.

The solar cell or panel 308 is integral to the enclosure of the sensing unit 222, but could be fixedly attached or even separate from the sensing unit 222. This embodiment uses a thin film solar panel, but other embodiments could use crystalline or polycrystalline types. To allow for daily sensor measurement reporting, an average of 2.5 hours per day of sunlight is enough to provide 1,000 joules per day to recharge the battery 328 for this purpose in one embodiment. In another embodiment, 4,500 joules per day from the solar cell allows for hourly sensor measurements and reporting to the aggregator 218.

A battery 328 may or may not be used where there is external power. If a battery 328 is included it can be a back-up source of power. The solar cell 308 is not needed where there is external power, but could be used as a backup source of power.

In one embodiment, the processor 304 monitors the stored power in the battery 328. The processor 304 calculates the frequency of sensor samples and radio reports and adjusts these frequencies according to the stored power. Extra measurements may or may not be reported over the WAN radio. In this way, the frequency of activity with the sensing unit 222 varies with the available power or sunlight. Some embodiments could vary the power of the LAN radio 332 according to the stored power.

After activation of a sensing unit 222 by it successfully seeing a transmission or blip from an aggregator 216, 218, it remains fully powered for a second to receive any transmission. The sensing unit 222 wakes to listen for a message according to a schedule. A fixed aggregator 218 can instruct the sensing unit 222 to immediately go into a sleep mode once the data is successfully gathered.

Some embodiments could vary the frequency of listening according to the power level. For example, when the battery 328 is fully charged and there is sunlight available, the schedule could be to listen every second or constantly. When the power is low, the schedule could change to listening every eight seconds. The rate at which listening occurs affects the responsiveness.

Depending on the energy available, the lower-power mode involves listening for a blip for a short period of time every 8 seconds to 1 minute in one embodiment before going into a sleep mode again. After successful blip by a handheld aggregator 216, the sensing unit 222 wakes every subsequent second for a while to make the sensing unit 222 more responsive to subsequent blips.

The LAN radio 332 remains in an active mode for 5, 10 minutes or so after receiving a transmission and then transitions to a low power mode. In the active mode, the radio listens for communication every second, and in the low power mode, the radio listens for communication every eight seconds. Other frequencies of this cycle are possible, including stopped—an exceptional condition when the battery is critically low. An idle (i.e., not transmitting) sensing unit 222 has a sleeping state and a listening state. A leakage current of about 30-120 uA is consumed in the sleeping state between listening. Typically, the sensing unit runs an idle cycle of waking to listen (for about 0.1 s in one embodiment) then sleeping until next time. The wake-to-listen cycle is normally repeated every second in the active mode, if we can afford the power, or every eight seconds to save power in a low power mode. During the 8-second low power mode, the sensing unit consumes about 300uA average current (about 30-120uA when sleeping and about 15 mA for 0.1s when listening).

Recalibration of the radio may periodically be required, which can take a couple of milliseconds per channel where there are 53 channels. Where radio transmissions are frequent enough, one channel is recalibrated each minute. The calibration parameters are stored in memory 336.

The sensing unit 222 could be customized to work with a particular sensor 324. The sensor 324 could be integral to the housing, fixedly attached or coupled with a cable in various embodiments. The sensor interface 320 is customized to provide the output to and receive the input from the sensor 324. An analog-to-digital converter could be included in the sensor interface 320. There are some standard sensor interfaces, for example, a 4-20 mA interface (i.e., four to twenty interface), that could be supported by the sensor interface 320 such that a number of sensors 324 could be supported by a given sensing unit 222. The firmware in the sensing unit 222 would know the particular attached sensor 324 and support it appropriately.

In one embodiment, there are two or more sensing units 222 that take flow metering readings. Each of the sensing units 222 stores at least 30 days of hourly flow readings and/or 65 days of daily flow readings. These measurements can be stored in the sensing unit 222 and/or the aggregator 216, 218. In one embodiment, there are ten or more flow meters using a single aggregator 218. All the flow meters are within communication range of the single aggregator 218.

Figure 13:
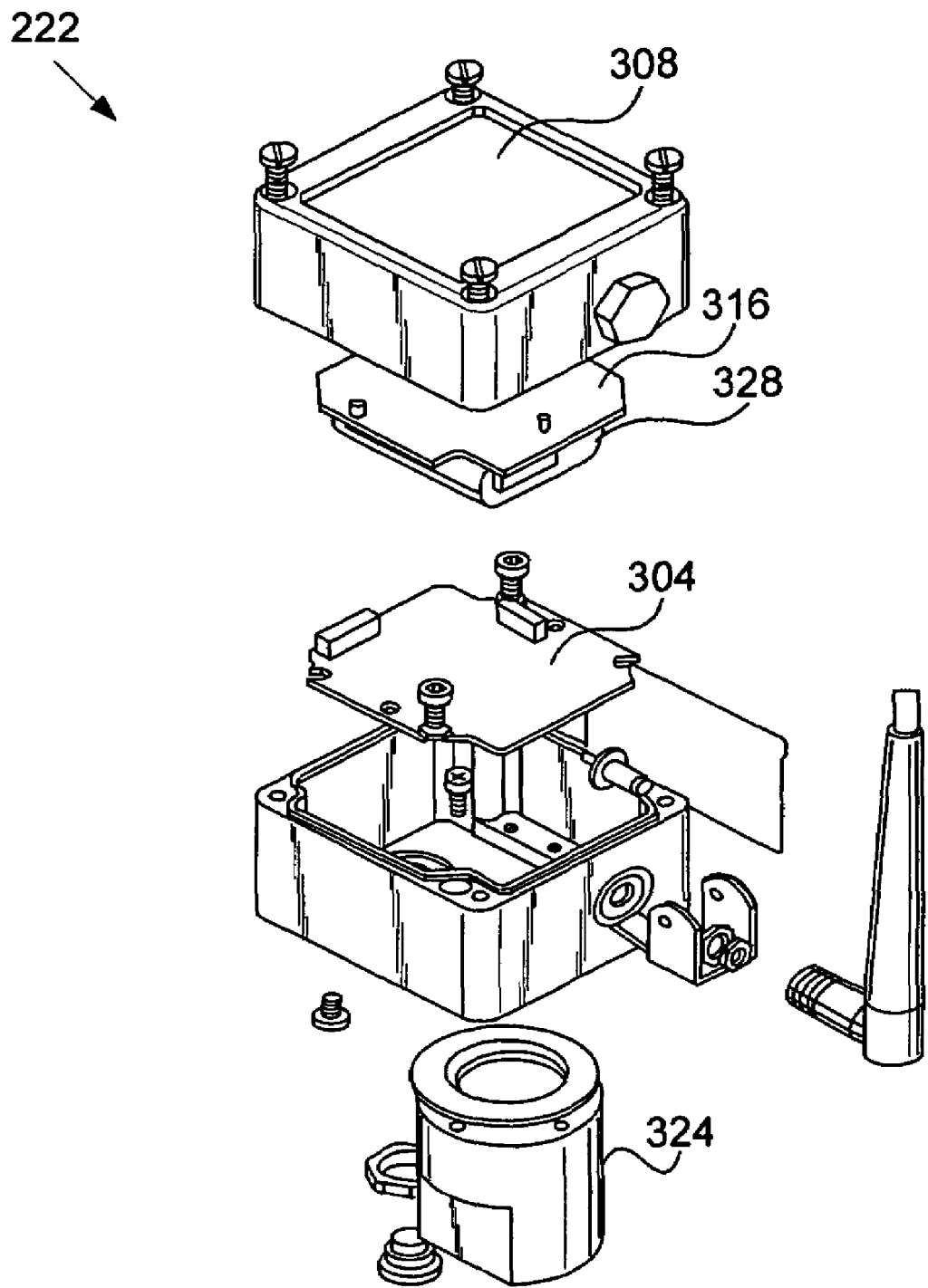
FIG. 13 provides an exploded view of a sensing unit.
Figure 14:
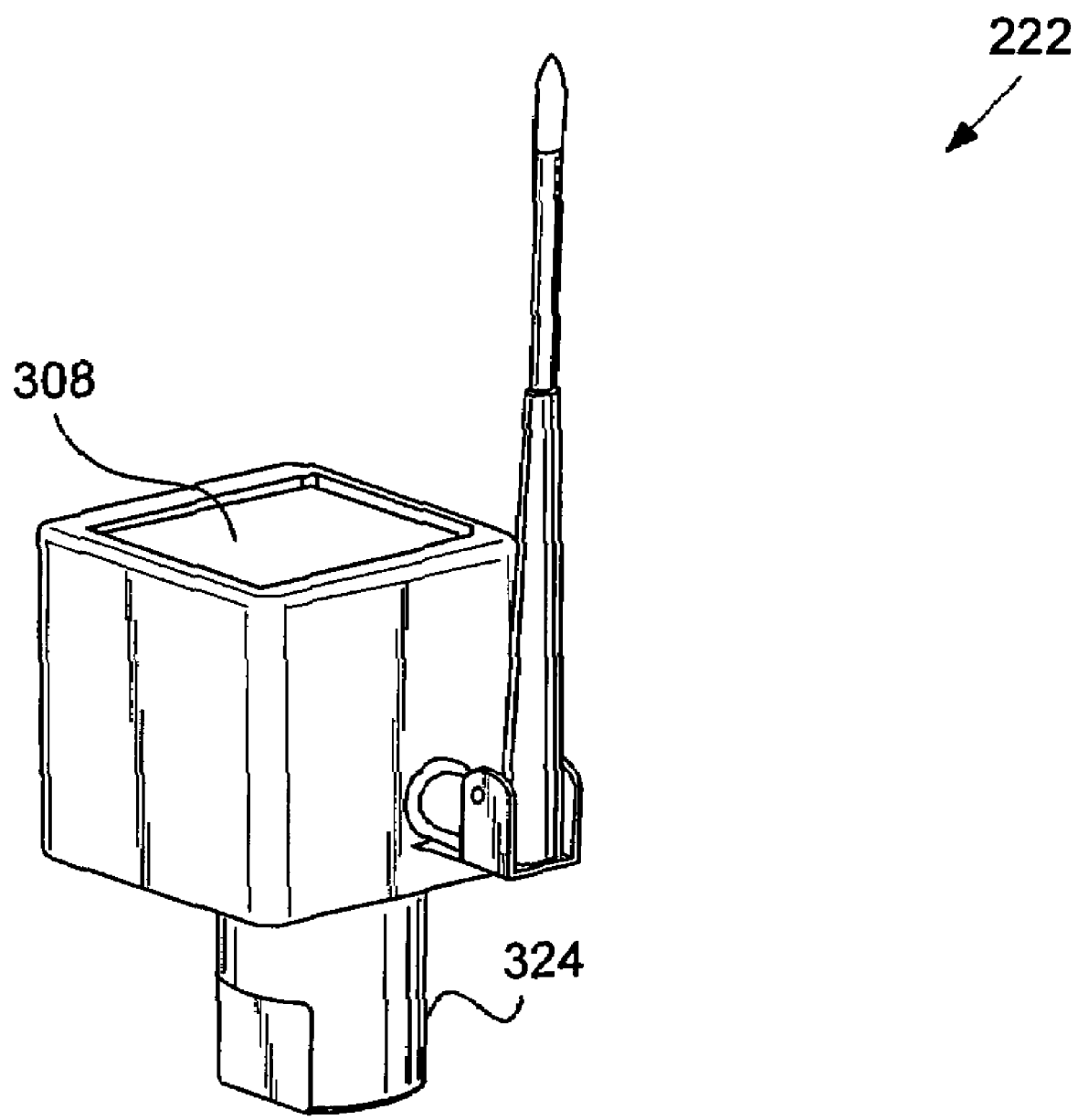
FIG. 14 provides a perspective view of the sensing unit of FIG. 13.

FIG. 13 illustrates an exploded view of an exemplary sensing unit 222 according to embodiments of the invention. The sensing unit 222 may be any of a plurality of sensing units as identified herein. In FIG. 13, like reference numbers represent like elements with other figures herein. FIG. 14 provides a perspective view of the same sensing unit 222.

Figure 4:
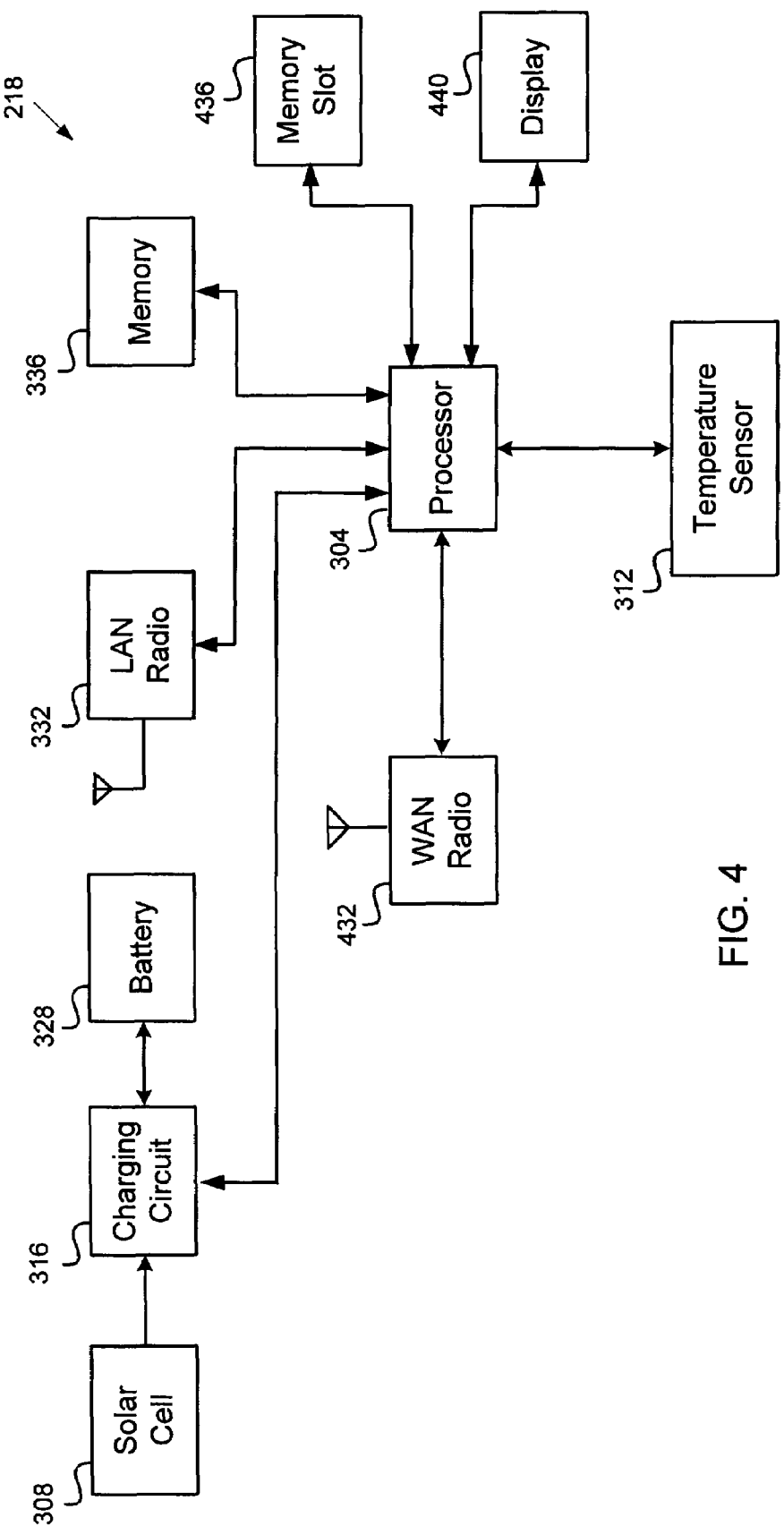
FIG. 4 provides a schematic diagram of a fixed aggregator according to embodiments of the invention.
Figure 15:
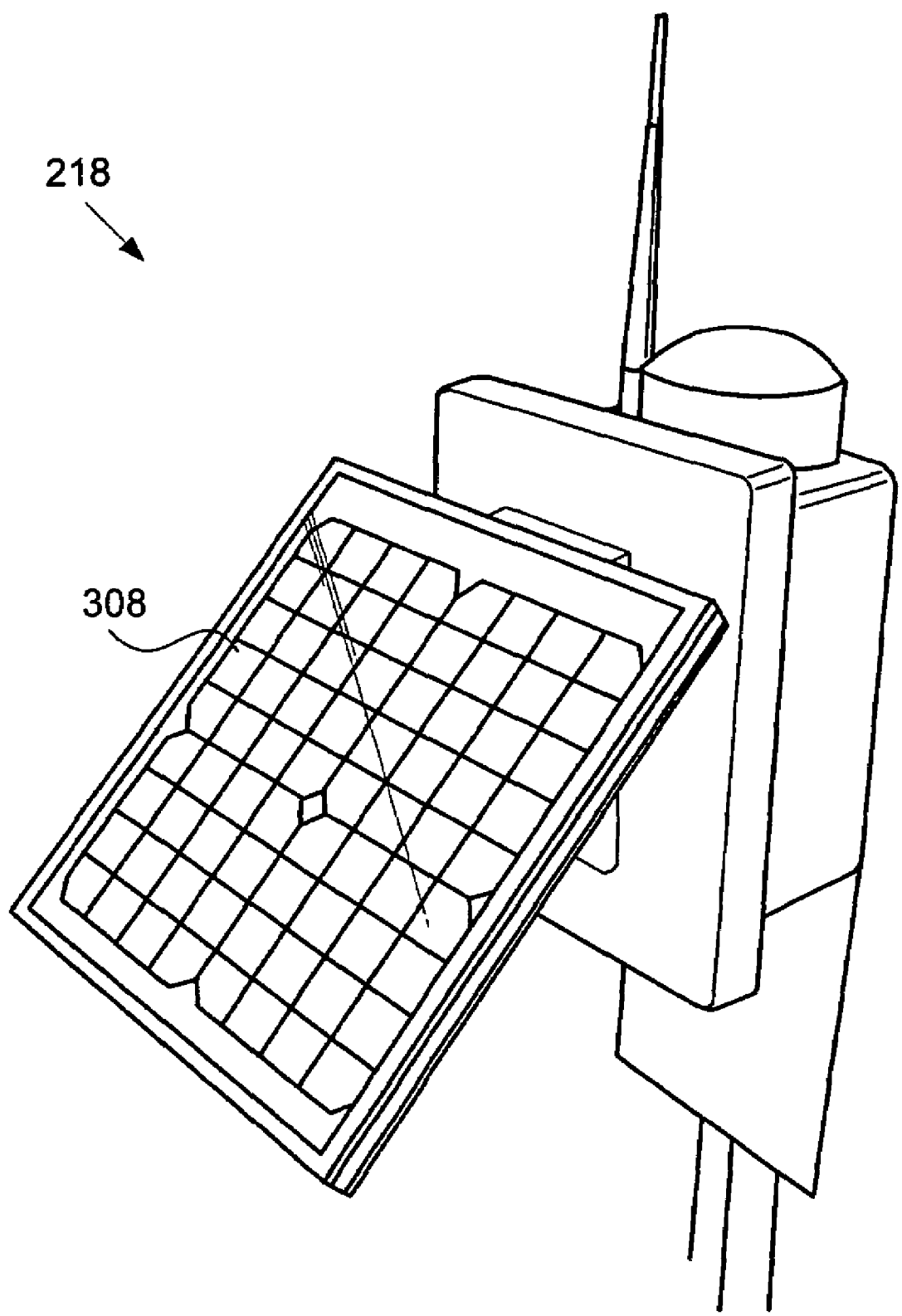
FIG. 15 provides a perspective view of a fixed aggregator according to embodiments of the invention.

Referring next to FIG. 4, an embodiment of the fixed aggregator 218 is shown. A perspective view of a fixed aggregator is provided at FIG. 15. The fixed aggregator 218 includes a WAN radio 432. The WAN radio 432 allows forwarding all the information gathered from sensing units 222 off to a remote location. Some embodiments allow receiving information via the WAN radio 432 to allow updating firmware, requesting information, modifying parameters, and/or other configuration.

Embodiments may or may not include a display 440 that gives status of the system 200 and allows inputting information with associated buttons or a touch-screen. The display 440 can be used to get last received sensor data or to refresh the sensor data by commanding the fixed aggregator 218 to request current sensor readings. The handheld aggregator 216 can also be used to get the last received sensor data from a fixed aggregator 218 or to request new readings that are forwarded to the handheld aggregator 216.

The fixed aggregator 218 can serve as a hub for one or more sensing units 122. As mentioned above, the handheld aggregator 216 can act as a hub in an off-line manner. The fixed aggregator stores sensor information reports in memory 336 for each sensing unit 222. Some embodiments, keep a history of past sensor information reports to the extent that memory allows. Periodic reports to another aggregator 216, 218 or the field data processor 226 are performed. Even though a report is made to the field data processor 226 another aggregator 216, 218 can always ask for a report.

The aggregator 216, 218 can request data from a sensing unit 222 or the sensing unit 222 can push information to the aggregator 216, 218. Either party can be the master of a given communication session. In addition to single sensor readings, the aggregator 216, 218 can gather trending data. Also, engineered values derived by a number of sensors and/or readings can be produced by the aggregator 216, 218. For example, the running average of flow over the last month could be produced from stored sensor readings reported to the aggregator 216, 218.

The interface between the processor and WAN radio 432 could be Ethernet, serial, parallel, USB, optical fiber, IrDA, or any other interface. The WAN radio 432 in this embodiment is a satellite modem, but could be any wired or wireless communication mechanism in other embodiments. The WAN radio 432 could be integral to, separate from, or fixedly attached to the remainder of the aggregator 218.

Some embodiments of the fixed aggregator 218 include a memory slot 436. This memory slot 436 allows insertion of a flash memory card. In some cases, the fixed aggregator 218 might use the memory slot 336 instead of having a WAN radio 432. Large amounts of data can be read from and/or loaded onto a memory card by the fixed aggregator 218. For example, a field engineer could load firmware updates for the fixed aggregator 218 and a number of the sensing units 222 on the memory card and the fixed aggregator 218 could upgrade the firmware on the various aggregators 216, 218 and sensing units 212. Insertion of a memory card with firmware would initiate a process where the aggregator 216, 218 would perform the upgrades as a background task.

In some embodiments, the fixed aggregator 218 could also have sensor inputs. These inputs could be generalized to work with many types of sensors or could be customized for a particular sensor. In this way, the fixed aggregator 218 can wirelessly gather data from other sensing units 222 as well as produce its own sensor data.

Figure 5:
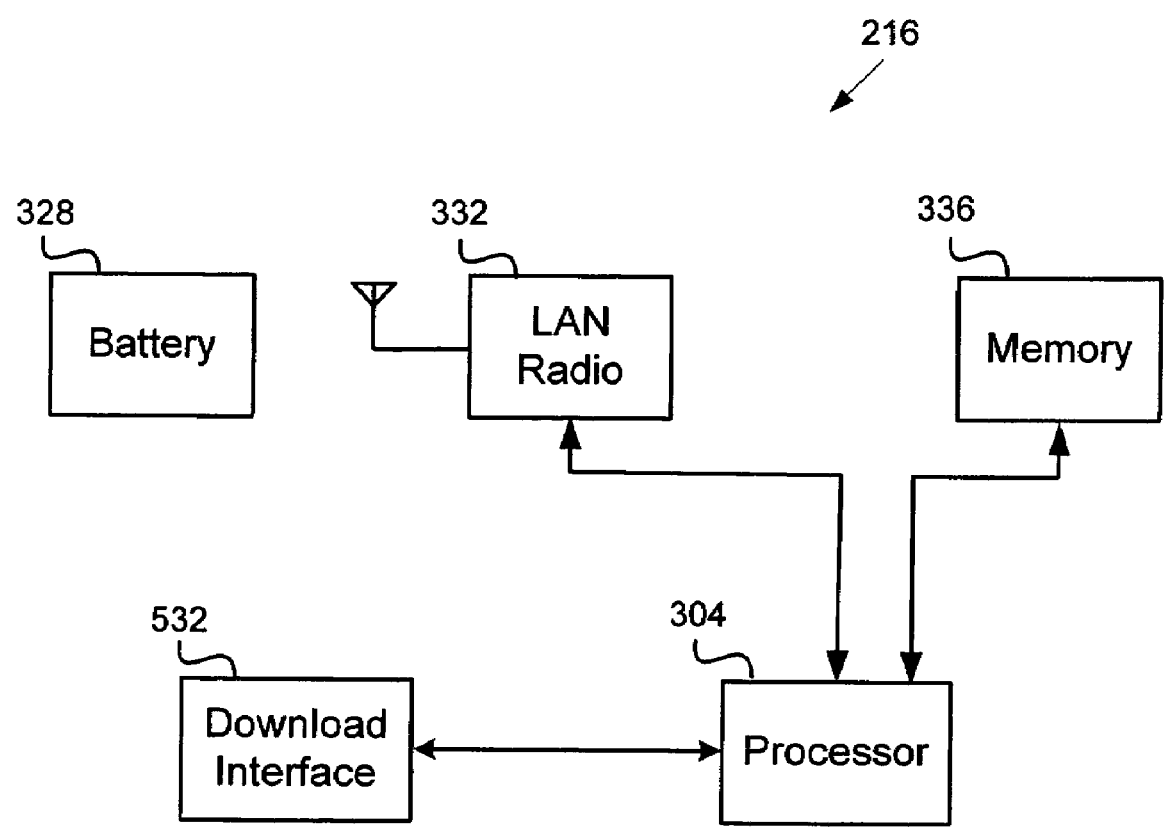
FIG. 5 provides a schematic diagram of a handheld aggregator according to embodiments of the invention.

With reference to FIG. 5, an embodiment of a handheld aggregator 216 is shown. The handheld aggregator 216 can be implemented with a standard PDA using an attached LAN radio 332. In other embodiments, a tablet computer, portable computer, proprietary computer, or car mounted computer could be used as the handheld aggregator 216. A download interface 532 allows transferring information gathered in site visits into the field data processor 226. The PDA could have WiFi, USB, Bluetooth, serial, IrDA, or other port that serves as the download interface 532. The transfer may occur from a computer or network port across the Internet 210 from the field data processor 226.

The LAN radio 332 can be in a compact flash, MMC or other form factor. The LAN radio 332 uses 900 MHz unlicensed spectrum, but other embodiments could use any desired RF frequency band. A serial interface API is used to interface the LAN radio 332 to the PDA to make writing of drivers easier. In this embodiment, the sensing units 212 use the same basic radio with a different interface and form factor. In the PDA, the LAN radio 332 range is about 1000 ft. Special antennas in some embodiments can extend this range. The data rate of the LAN radio 332 is 4800 baud. Use of a low data rate allows for higher sensitivity. Other embodiments could use a Zigbee IEEE 802.15.4 standard, a Bluetooth, a WiMax, or a WiFi radio as the LAN radio 332 that uses a beacon and has a 30 m range.

Each sensing unit 222 can communicate with any fixed or handheld aggregator 216, 218 that is nearby. The handheld aggregator 216 is added to the network 200 just like any other node 216, 218, 222 and can request stored information on sensing unit or other aggregator 216, 218. Each node 216, 218, 222 has an address and the handheld aggregator 216 could be configured with layouts and expected nodes 216, 218, 222 such that non-reporting nodes could be identified. The addresses could define administrative domains to keep others from addressing your nodes 216, 218, 222. The handheld aggregator 216 could communicate with one node 216, 218, 222 that is coupled to other nodes 216, 218, 222 not within communication range of the handheld aggregator 216 in a peer-to-peer fashion.

In one embodiment of the distributed sensing network 200, an improved beam-pump system is supported. Pump off control is a sub-system that measures the pump's performance with a sensing unit 222 and controls the beam pump to optimize yield of pump and to save power. In one embodiment, this helps avoid running the beam pump when well is pumped off, which costs electricity and could damage the pump. In another embodiment, the sub-system could be optimized to only pump at night when electricity is cheaper. In plungerless well embodiment, the sub-system could automatically watch the pressure and fluid monitors to optimize flow.

Figure 6:
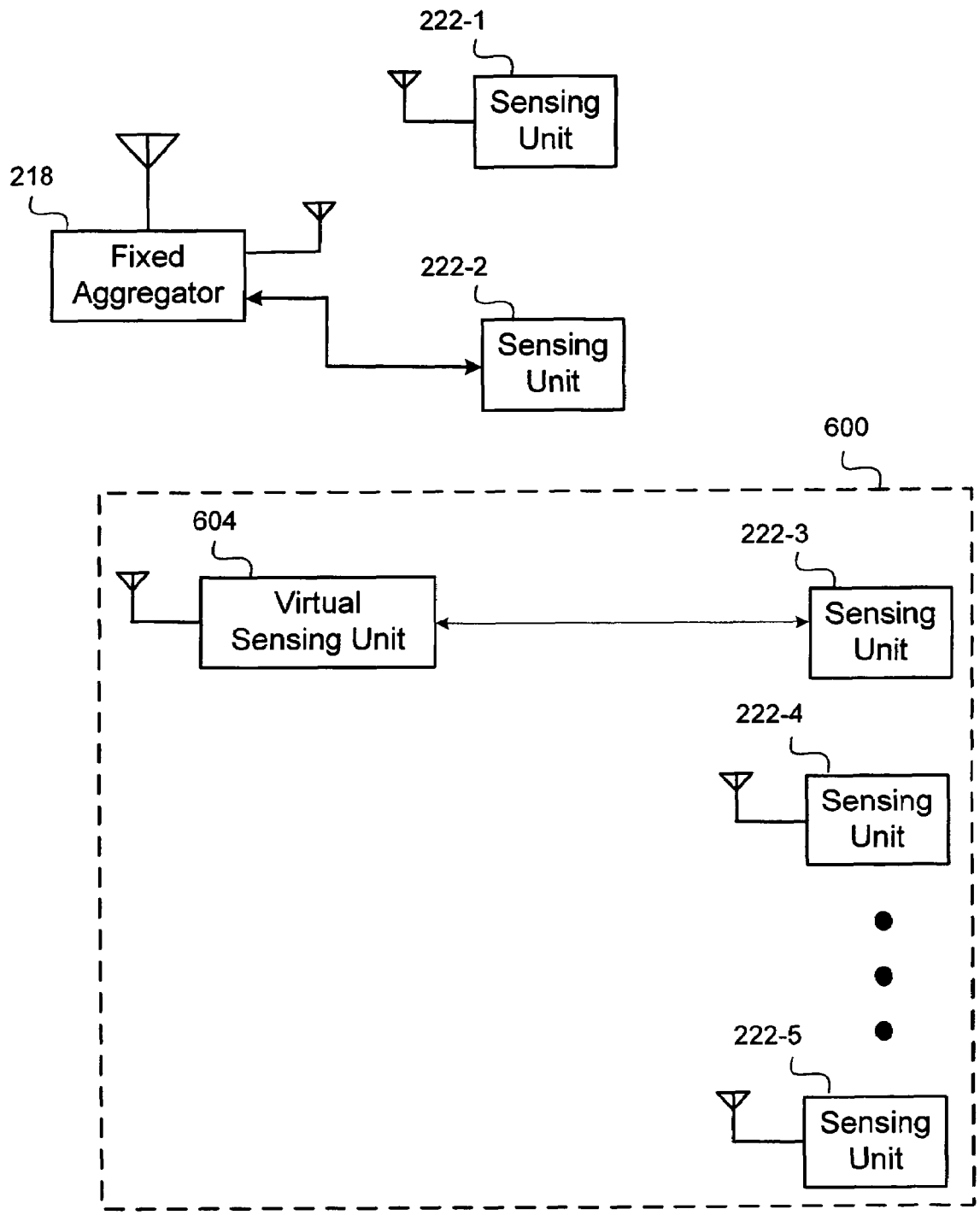
FIG. 6 provides a schematic diagram of a virtual sensing unit according to embodiments of the invention.

Referring next to FIG. 6, an embodiment of a virtual sensor 600 is shown. The direct sensing network 100 can include virtual sensors 600 that appear just like a sensing unit 222. The virtual sensor 600 includes a subnet of sensing units 222-3, 222-4, 222-5 that gather sensor information that is reported to a virtual sensing unit 604, which may or may not have its own sensors. The virtual sensing unit 604 calculates an engineered value using information from the subnet of sensing units 222-3, 222-4, 222-5 and could have alarm triggers. The aggregator 216, 218 sees the virtual sensing unit 604 as any other sensing unit 222 and reports out the engineered value. Examples of engineered values include dew point, pump broken, gas volume delivered, etc.

In one embodiment, sensing units 222 could talk with each other to gather the data required to make a virtual sensor. One of the sensing units 222 could produce the engineered value and report it to a fixed aggregator 218. For example, a first sensing unit may not be able to communicate with the sensing unit performing the calculation, but could forward the sensor reading to another sensing unit that could communicate the sensor data.

The virtual sensor 600 could have the ability to activate an alarm that could shut down a pipeline or some equipment. Operation of any machine or mechanism could be controlled by a virtual sensing unit 604 or sensing unit 222 based upon data gathered by the virtual sensor 600.

Having described a sensor network and various components deployed within it, a communication protocol is now described for communicating within the network. Time synchronization is a perennial problem in frequency-hopping systems. Radios hop from frequency to frequency according to a pseudorandom or direct sequence such that the sending and receiving parties know which frequency to use at any given moment. Conventional systems use a time beacon to keep radios synchronized by, for example, sending time synchronization each second.

Conventionally, frequency hopping radios are always active such that they are always receiving and thus able to stay in synchronization with a respective transmitter. By keeping active, the power consumption is high. Often, these frequency hopping radios are point-to-point links, thus one receiver need only track the hopping sequence of one transmitter (or vice-versa). Point-to-point type links are simple, but leaving the radio always active is inefficient.

In one embodiment, each radio knows the relative time of other radios in the multi-point system. By knowing the frequency sequence and the time offset for a particular radio, a radio can synchronize with another radio. Time offsets for all the radios in communication range allow determining the proper frequency to use. This mode of operation is called synchronous mode.

Once two radios are communicating in the synchronous mode, the radios exchange time base information. The unit receiving the time base information does not synchronize, but simply notes the time difference and will use the delta or offset when communicating with that unit. Communication in synchronous mode uses the radio in high-power or active mode for only a few hundred milliseconds. The radio has a transmit mode or state (i.e., actively transmitting), a listen mode or state (i.e., listening for transmission) and a sleep mode. It needs only transmit for a short while (assuming it is sending a short packet of data) in the transmit mode because the radio often knows when the target receiver is listening. Transmission is usually much more power consuming than receiving, so this embodiment keeps transmission mode short. Knowing when the receiver is listening (and on what channel) allows avoiding wasted transmission time and increases efficiency in one embodiment.

When a time offset is not available or is inaccurate, an asynchronous mode of communication allows discovering a target radio's frequency. Asynchronous mode is also a fallback when synchronous mode communication fails. Transmitting on all possible frequencies until the target radio responds allows stumbling upon the proper frequency, which is defined herein as asynchronous mode of establishing communication. All radios wake periodically to listen for another radio attempting contact, for example, wake every second. Once the frequency is known, an exchange of time base information allows operation in the synchronous mode. The process of establishing communication asynchronously can take several seconds (i.e., typically 2 to 10 or more seconds). In one embodiment, a synchronous transmission can take one hundredth of the energy (i.e., 50-100 ms transmit duration) of an asynchronous connection.

The length of this latency in asynchronously establishing communication generally depends on how often the receiver is waking up from sleep mode. A transmitting radio cannot connect with a receiver before it next wakes up from sleep mode, which is typically every one or every 8 seconds in various embodiments. In one embodiment, the receiver only wakes every 32 seconds, for example, in dark conditions where the battery is low. With the 32 second waking cycle, a typical connection time is about 20 seconds and probable connection time is about 36 seconds, although the radio can sometimes miss this connection and need to wait another 32 seconds.

Initially, the radios asynchronously discover new nodes without knowing relative time information for any new node. This discovery starts with transmission of a very short "blip" on all (i.e., 53 channels in this embodiment) hopped frequencies. A blip is the shortest transmission that can be recognized on one frequency and contains no data. The receiving radios wake from sleep mode to listen mode to receive any blip. If no blip, the receiver returns to sleep or in-active mode.

Where there is a blip received, the receiver listens for awhile to see if there is a subsequent transmission of the receiver's address on the channel. The subsequent transmission of the receiver's address would indicate that the receiver was the target of some communication that could proceed after the target is confirmed with the second transmission. Should a particular receiver not receive its address, it will eventually return to sleep mode unless it keeps receiving blips. Where the address is received, both radios exchange time base information and switch to communication in the synchronous mode.

The transmitting radio can blip on all 53 channels in about 53 milliseconds in one embodiment. Building on these two simple patterns (blipping-all and addressing one) we can blip all channels and send just one address (on one channel) and listen for a response on that channel in a total of 80 ms. This cycle (blip all channels, address on one channel and listen on that channel) continues as the one channel that is addressed each time is advanced until we have blipped each channel 53 times and addressed all 53 channels or until the target radio responds.

The receiver stays awake when it hears a blip. Thus, the receiver normally wakes for about 90 ms (that time being slightly greater than 80 ms to allow time to hear at least one blip on his channel in this time), and if the receiving radio hears at least a blip it stays awake in listen mode, or else goes back to sleep mode. As the transmitter continues the above cycle the transmitter will blip on the receiver's channel every 80 ms and the receiver will stay awake. Within about 5 seconds (i.e. 53×80 ms) maximum for this embodiment, the target receiver will hear one time when the transmitter transmits an address on his channel. If several seconds expire without hearing another blip or his address on his channel, the receiver goes back to sleep.

Where asynchronous mode fails to connect with the target radio, synchronous and asynchronous communication attempts can be repeated a number of times. Some embodiments listen before transmitting a blip in asynchronous mode to avoid stepping on another's transmission. To aid in differentiating a blip from noise, each radio in one embodiment tracks the average floor for each channel. When there is a significant deviation from that floor, the radio can presume a blip is being transmitted.

Figure 7:
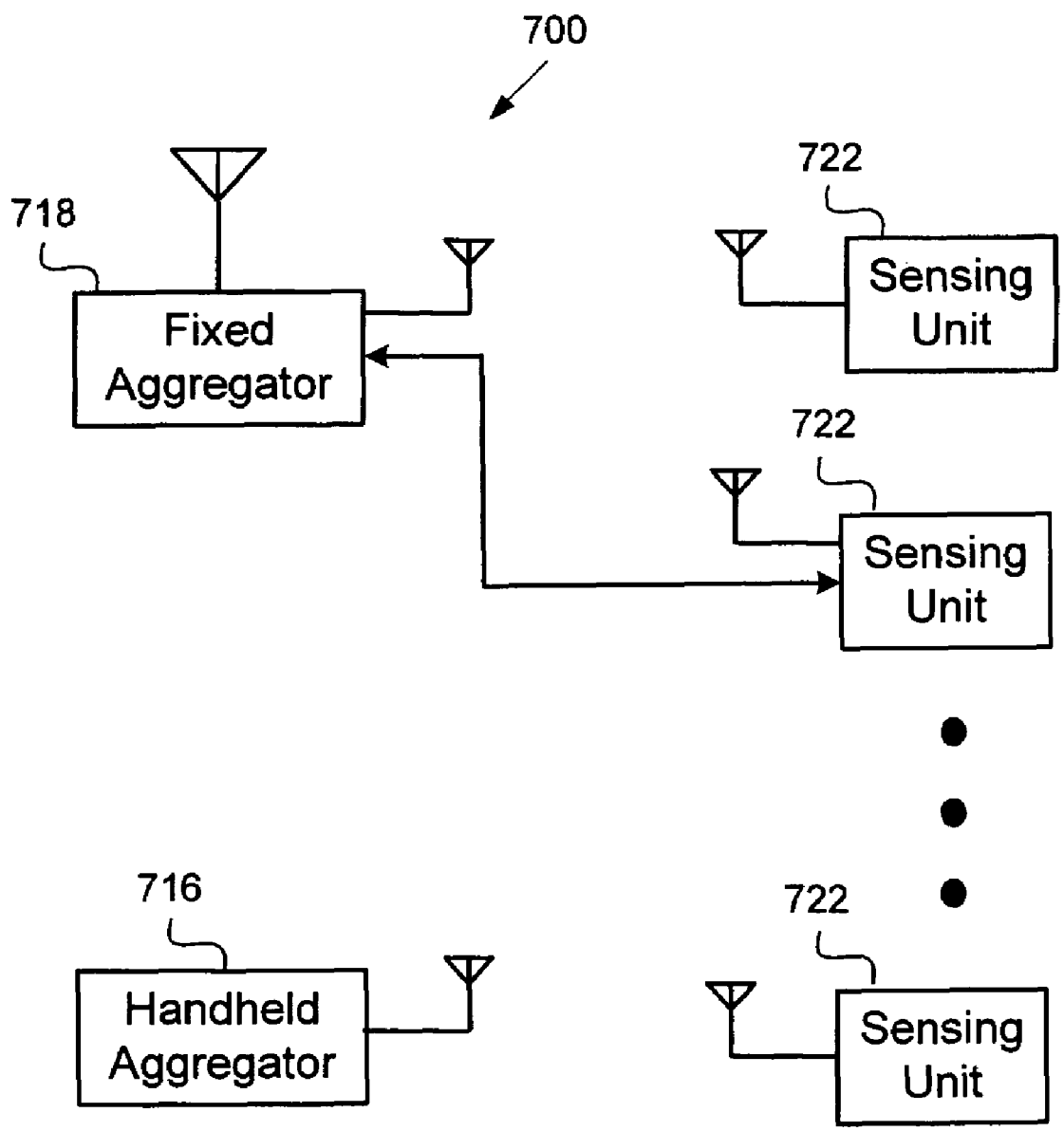
FIG. 7 provides an exemplary local area field sensing network according to embodiments of the invention.

Referring to FIG. 7, an embodiment of a radio cluster 700 is shown. The cluster 700 includes sensing units 722 and aggregators 716, 718. The sensing units 722 gather information that is forwarded to the aggregators 716, 718 when requested or according to some periodic or triggered reporting mechanism. A fixed aggregator 718 has a WAN radio to relay the information to a remote site. A handheld aggregator 716 can also be used to gather information from the sensing units 722 by initiating contact with each sensing unit 722 and/or fixed aggregator 718.

Any of the aggregators 716, 718 and sensing units 722 can initiate communication or wait to be communicated with. The aggregator 716, 718 can initiate communication to query for information or to configure the sensing units 722 which act as slaves. In one embodiment, the handheld aggregator 716 does not listen for reports from the sensing units 722. It initiates all contact to configure and gather information from the sensing units 722 and/or fixed aggregators 718. In some embodiments, the handheld aggregator 716 could receive reports from sensing units 722. To report alarm conditions, a sensing unit 722 can initiate a transmission to report the alarm and other information to the fixed aggregator 718. Where virtual sensors are configured, a sensing unit 722 may communicate with another sensing unit 722.

Figure 8:
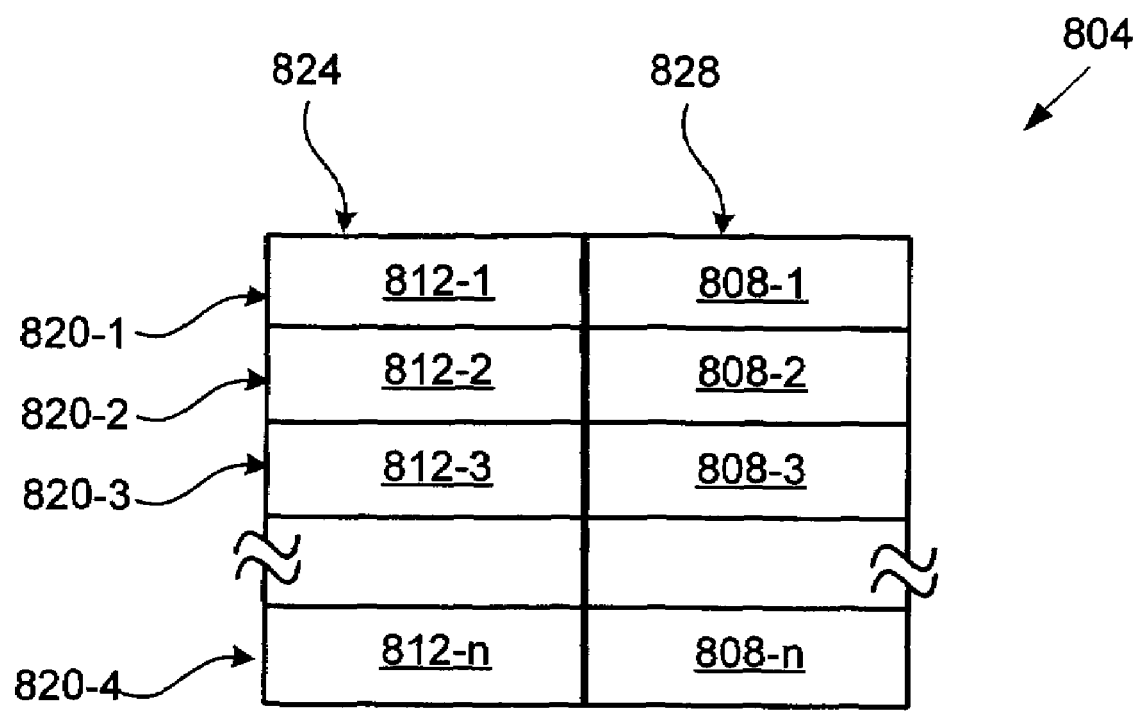
FIG. 8 provides an exemplary time reference database.

With reference to FIG. 8, an embodiment of a time reference database 804 is shown. Each unit 716, 718, 722 keeps a time reference database 704 of time offsets for all the units 716, 718, 722 it might talk with. There are entries 820 for each radio in communication range. A radio serial number column 824 and time delta column 828 respectively contain radio serial numbers 812 and time deltas 808 for each entry 820. For example, the second entry 820-2 has a second radio serial number 812-2 and a second time delta 828-2. To determine the local time base for the second entry 820-2, the radio takes its local time base and applies the time delta 808-2 to determine the time base of the radio indicated by the second serial number 812-2.

In one embodiment, one radio could forward its time reference database 804 to another radio to help that radio establish synchronous communication with more radios. Upon receipt of the time reference database 804 each entry is updated according to the local time base such that each entry is an offset with respect to the local time base. Some embodiments of the time reference database 804 could indicate when the time base information for a particular radio was last received to know how fresh the information is. Where readings are more than 55 minutes, 75 minutes, 4 hours, 1 day, or 2 days old in various embodiments, the time delta for a particular radio could be automatically deleted to force asynchronous communication when contact next occurs.

Figure 9A:
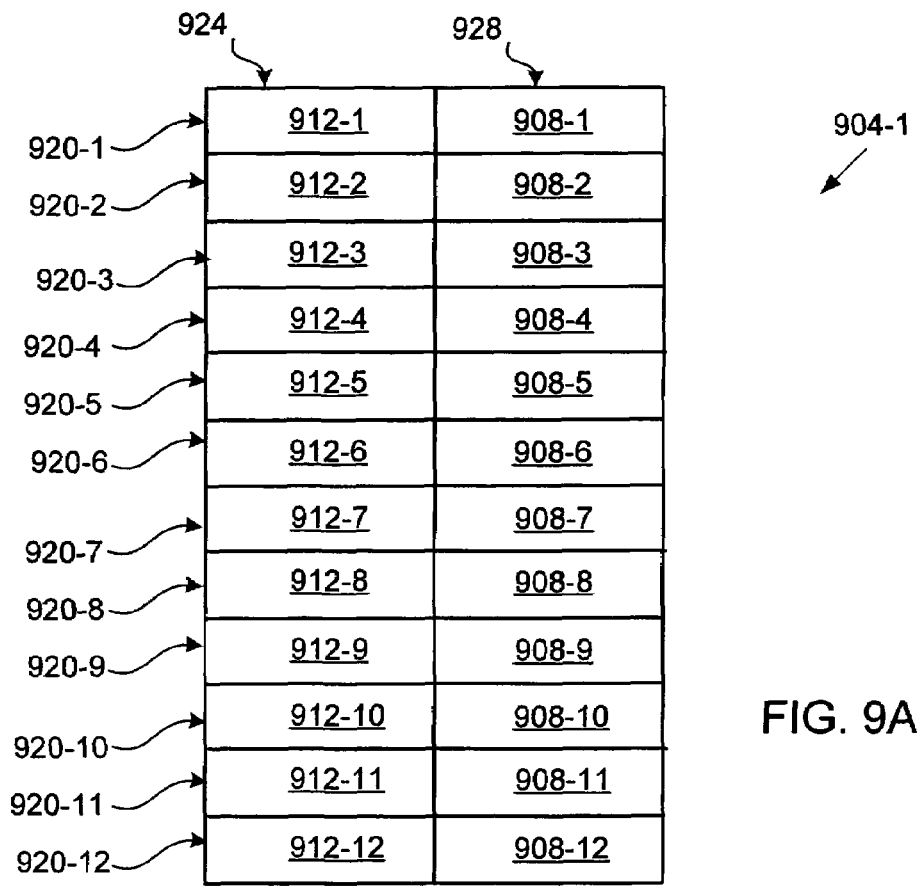
FIGS. 9A and 9B provide exemplary frequency hop lists according to embodiments of the invention.

Referring next to FIG. 9A, an embodiment of a frequency hop list 904-1 is shown. The frequency hopping is along a known pseudorandom pattern that can be calculated, but each unit 716, 718, 722 stores a few past frequencies 908 and a few future ones in a frequency hop list 904-1. The frequency hop list 904-1 has hop entries 920 with delta times 912 and frequencies 908 arranged in two columns 924, 928. A particular hop entry 920 gives a frequency and a time 324 that it was used. The time is relative to the time base of the unit 716, 718, 722.

The number of frequencies to store is influenced by the largest positive and negative time deltas 808 in the time reference database 804, but some embodiments could have limits on the time delta 808 to reduce the size of the frequency hop list 904-1. The depicted embodiment shows twelve entries 920. If the time delta 808 exceeds the times 924 in the frequency hop list 904-1, communication with the radio entry 820 corresponding to the time delta 808 proceeds in asynchronous mode, but some embodiments could calculate hop entries. One embodiment grows the size of the hop list 904-1 according to the current largest positive and negative time delta 808.

Figure 9B:
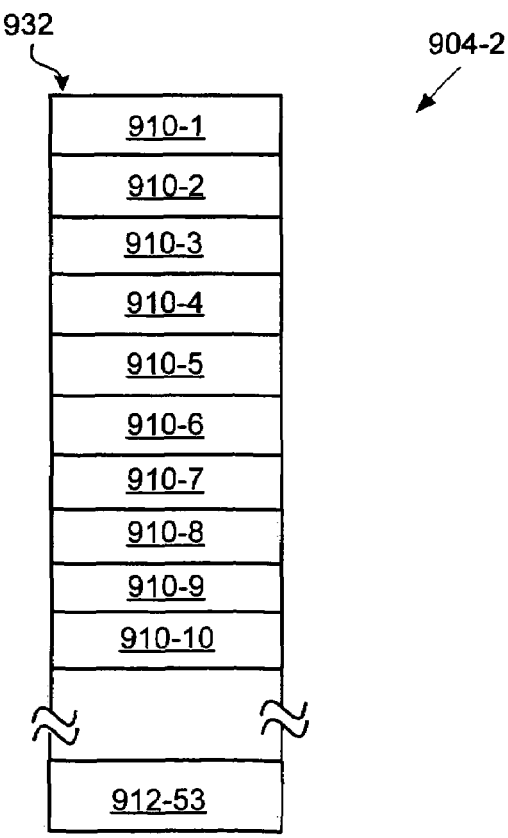

With reference to FIG. 9B, another embodiment of a frequency hop list 904-2 is shown. In this embodiment, the frequency hopping sequence is pseudo-random but still repeats cyclically every 53 hops in this embodiment that has 53 channels. The frequency hop list 904-1 has a single column 932 which has each channel and/or frequency 910 listed. In this embodiment, the frequency hop list 904-2 arranges 53 frequencies in the sequence in which they are used. When two radios exchange time references, they also exchange where we are in the frequency hop list 904-2 so that the other end can calculate the hop offset.

To find the proper frequency, an offset number between 0 and 52 is added to our current hop number to derive the target hop number, then look that up in the frequency hop list 904-2 to see what frequency to use. When we know the channel offset to a target receiver we can index back or forward in this table from where we are by the offset amount to determine where the target receiver is.

Figure 10:
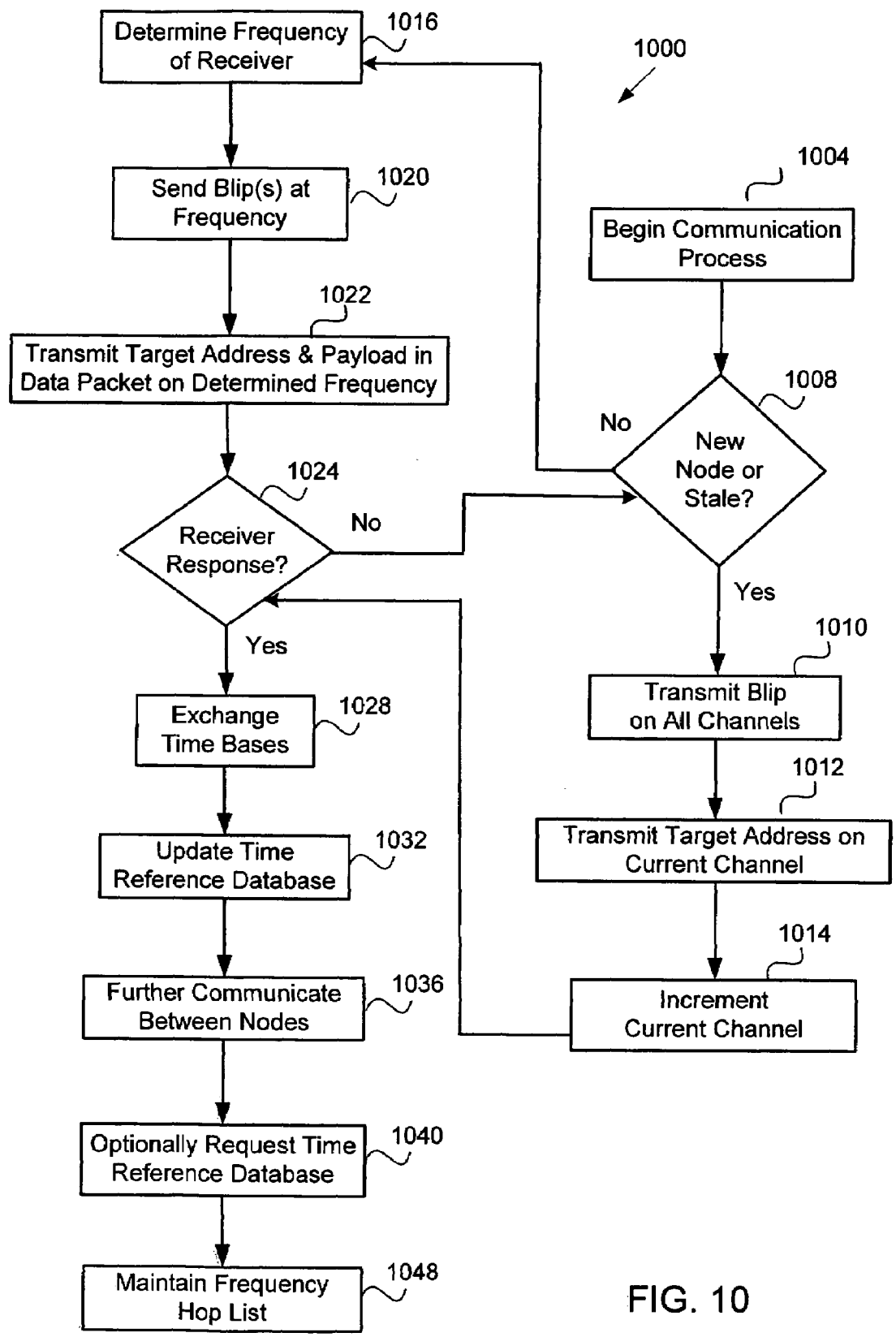
FIG. 10 provides an exemplary communication synchronization process according to embodiments of the invention.

Referring next to FIG. 10, an embodiment of a communication process 1000 is shown. The communication process 1000 tries to communicate with radios in a synchronous mode, but will fall back to an asynchronous mode when that is not possible. The depicted portion of the process 1000 begins in step 1004. A check is made of the time reference database 804 in step 1008 to see if there is a radio entry 820 for the particular radio serial number 812. Some embodiments may further screen the radio entry 820 to determine if it is stale. Also, where one or more synchronous communication attempts are made, the transmitting radio may fall-back to asynchronous mode.

If there is no radio entry 820, if it is stale, or if synchronous communication is not successful, an asynchronous mode connection attempt is made to communicate with the radio in steps 1010, 1012 and 1014. In step 1010, a blip is transmitted on all channels. Next, the target serial number is transmitted in step 1012 on the current channel. The current channel is incremented in step 1014 such that if there is no response, the next channel will be tried next time through the loop. If there is no receiver response as determined in step 1024, processing loops back to step 1008 for another attempt at the new channel.

If there is a valid radio entry 820 in the time reference database 804, processing goes from step 1008 to step 1016 where the frequency used by the receiver is determined. This determination uses the time delta 808 which is applied to the current time reference to find a time 912. The frequency hop list 904 is referenced to determine the frequency 908 that corresponds to the time 912.

In step 1020 one or more short transmissions or blips without any information is sent at the determined frequency 908. Before the synchronously determined transmission time, blips are sent about every 50 milliseconds to hold the receiver open (i.e., retain the receiver in listen mode) until the radio serial number 812 for the target radio is transmitted along with the payload of the packet in step 1022. In this embodiment, the transmission of step 1022 is done a little late. By blipping beforehand and transmitting late, the target awakes early and stays awake to allow for larger timing differentials between the two radios without preventing synchronous communication.

It does nothing to help synchronization if transmission in step 1022 is a little early, so, in some embodiments, this transmission is done a little late, assuming that the pre-blipping will ensure the receiver stays waiting in listen mode. In this way, we buy some time tolerance either side of the nominal receiver listening interval. Inevitably, clocks for the various radios drift a little relative to each other so timing information becomes unreliable ("stale") after some time. By increasing the timing margin in this way, the time information is good for longer. For example, we may be able to make only one transmission per day in one embodiment to keep timing information adequately fresh if we can extend the timing window to +/−1 second around the nominal time slot. How long timing info remains fresh is largely a function of temperature as the crystal oscillator clocks tend to drift more as the temperature deviates (above or below) from room temperature. If the target radio fails to respond in step 1024, processing loops back to step 1008 to try initiating a connection in the asynchronous mode.

Alternatively, where the receiver responds in step 1024, processing continues to step 1028 where time base information is exchanged. Any corrections to the two time reference databases 804 are made in step 1032. Steps 1028 and 1032 are optional and may be avoided where successful communication has happened in the recent past, but would occur if asynchronous mode was performed with steps 1010, 1012 and 1014 to get to this point in the process 1000. Any further communication can take place in step 1036. Some embodiments can exchange entries 820 or the whole time reference database of the other side of the communication link to allow possible synchronous communication with more units 716, 718, 722. More recently updated entries 820 from the other unit 716, 718, 722 may replace older entries 820 in the time reference database 804 of the receiving radio.

Throughout the operation of the unit, the frequency hop list 904 is maintained. In this embodiment, each hop entry can be calculated to formulate the table according to its pseudorandom variance. Use of the frequency hop list 904-1 avoids on-the-fly calculations of a frequency 908 for a particular time 912 when asynchronous communication is attempted.

In this embodiment, the radios in the aggregators 716, 718 and sensing units 722 use a polled receiver protocol. Communication between radios is not necessarily constant or periodic. In a polled frequency hopping system, any radio can initiate communication at any time with another radio in a peer-to-peer fashion. Non-polled systems may use a time beacon or maintain frequent communication under the control of a master radio to keep synchronized. For example, with constant communication a transmitter simply commands the receiver when and where to hop next, in real time.

In another embodiment, time base information for one unit is exchanged with another unit by coding the time base information into every acknowledgement packet. In step 1028, the receiving unit could add its time base information into an acknowledgement of the data packet. The sending unit would receive the time base information, correct for any transmission delay and update the time reference database 804 in step 1032.

In one embodiment, the radios can resolve overlapping communication. A transmitter can respond to communication attempts that fall on spurious responses of the receiver. The transmitter notes on what channel the message was sent in the transmitted message. If the receiver detects the message on a spurious response, it knows where it should have been received and can respond on the correct channel to ensuring a good response and that timing & channel information are transferred correctly.

In another embodiment, an integer related set of variables for wake/sleep cycles (1, 2, 4, 8, 16, 32, 64 seconds) allow for power management according to available energy. The integer timing relationship makes it easier to calculate time differences and more tolerant to getting it wrong (e.g. we assume the receiver is waking every 4 seconds but in fact it is waking every 2 seconds, it will be awake when we transmit in any case. Even the other way around if we assume it is waking every 4 but it wakes every 8 seconds we can get him on the second synchronous attempt and have a 50% probability on the first attempt).

One embodiment uses the variable wake-sleep cycle to provide optimum responsiveness and limit communication delay. This is done in three ways. One, we wake the receiver as often as we can based on power available, computed from battery charge, strength of sunlight, etc. Two, we increase the receive wake rate following any communication so that follow up messages in the same dialog are more responsive. Three, the wake/sleep cycle speed can be increased at times of day when they device is more likely to be interrogated or at times that the device has learned it is more likely interrogated. For example, consider the oil pumper who visits a pump site around the same time every day; we can use 1-second cycle for an hour around the time that the oil pumper is expect and 8-second cycle to save power at other times.

Looking to FIG. 16, a flow chart is presented describing a method of communicating amoung wireless devices comprising a target device and a transmission device. The method commences at block 1060 which provides for a wireless transmitting device, a frequency hopping schedule comprising a sequence of frequencies. Next, as represented at arrow 1062 and block 1064, the step provides at a wireless target device, alternately sleeping and listening on a frequency in the sequence of frequencies according to the frequency hopping schedule.

The program then continues as represented at arrow 1066 and block 1068 providing for the step of exchanging time base information between the target device and the transmitting device. As represented at arrow 1070 and block 1072, this exchanging procedure includes the step of: from the transmitting device, sending an address of the target device on sequential runs of the frequencies in the frequency hopping schedule. A next sub-step is represented at arrow 1074 and block 1076 which provides for transmitting from the transmitting device blips on each of a plurality of the frequencies in the frequency hopping schedule, wherein a blip signals any target device to at least temporarily cease alternately sleeping and listening. Block 1068 further includes the sub-step as represented at arrow 1078 and block 1080 which provides at the transmitting device, receiving a response from the target device wherein the response includes time base information.

Returning to block 1068, as represented at arrow 1082 and block 1084, the next step provides at the transmitting device, using the time based information to determine a current frequency of the target device.

Finally, as represented at arrow 1086 and block 1088, a final step sets forth from the transmitting device, transmitting a packet of information uniquely addressed to the target device using the current frequency.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention, which is defined in the following claims.

What is claimed is:

1. A method of communicating among wireless devices comprising a target device and a transmitting device, the method comprising the steps of:
   providing from the transmitting device a frequency hopping schedule to the target device, wherein the frequency hopping schedule comprises a sequence of frequencies;
   at the target device, alternately sleeping and listening on a frequency in the sequence of frequencies according to the frequency hopping schedule;
   exchanging time base information between the target device and the transmitting device;
   at the transmitting device, using the time base information to determine a current frequency of the target device; and
   from the transmitting device, transmitting a packet of information uniquely addressed to the target device using the said current frequency.

2. The method of claim 1, wherein exchanging time base information between the target device and the transmitting device comprises:
   from the transmitting device, sending an address of the target device on sequential ones of the frequencies in the frequency hopping schedule; and
   at the transmitting device, receiving a response from the target device, wherein the response includes the time base information.

3. The method of claim 2, wherein exchanging time base information between the target device and the transmitting device further comprises transmitting blips on each of a plurality of the frequencies in the frequency hopping schedule, wherein a blip signals any target device to at least temporarily cease alternately sleeping and listening.

4. The method of claim 1, wherein the transmitting device and the target device are comprised by an industrial sensing network.

5. The method of claim 1, wherein the target device comprises a wireless, self-powered, sensing device.

6. The method of claim 5, wherein the packet of information uniquely addressed to the target device comprises at least a portion of an instruction for the sensing device to report sensing information.

7. The method of claim 5, wherein the sensing device comprises a selection from a group consisting of temperature sensor, pressure sensor, and vibration sensor.

8. The method of claim 1, wherein the sequence of frequencies comprises 53 channels comprised by a range of frequencies from about 902 MHz to about 928 MHz.

9. A wireless sensing device, comprising:
   a control system;
   a self-contained power source connected for energization of the control system;
   a bidirectional radio operably connected to the control system;
   a sensor operably connected to the control system; and
   wherein the control system is programmed to cause the sensing device to:
      receive a frequency hoping schedule, wherein the frequency hopping schedule comprises a sequence of frequencies over which the radio is configured to communicate;
      alternately sleep and listen on a frequency in the sequence of frequencies according to the frequency hopping schedule;
      respond to a blip on a given frequency by at least temporarily ceasing alternately sleeping and listening;
      receive a uniquely addressed transmission from a transmitting device;
      respond to the uniquely addressed transmission with an acknowledgement transmission, wherein the acknowledgement transmission includes time base information; and
      receive a packet of uniquely-addressed information on a frequency determined, at least in part, by the time base information and the frequency hoping schedule.

10. The device of claim 9, wherein the device is comprised by an industrial sensing network.

11. The device of claim 9, wherein the device comprises a selection from a group consisting of temperature sensor, pressure sensor, and vibration sensor.

12. The device of claim 9, wherein the packet of uniquely-addressed information comprises at least a portion of an instruction for the device to report sensing information.

13. The device of claim 9, wherein the sequence of frequencies comprises 53 channels comprised by a range of frequencies from about 902 MHz to about 928 MHz.

14. A wireless field sensing network, comprising:
at least one transmitting device; and
at least one target device having a radio;
wherein the at least one target device is configured to:
receive a frequency hoping schedule, wherein the frequency hopping schedule comprises a sequence of frequencies over which the radio is configured to communicate;
alternately sleep and listen on a frequency in the sequence of frequencies according to the frequency hopping schedule;
respond to a blip from said at least one transmitting device on a given frequency by at least temporarily ceasing alternately sleeping and listening;
receive a uniquely addressed transmission from the transmitting device;
respond to the uniquely addressed transmission with an acknowledgement transmission, wherein the acknowledgement transmission includes time base information; and
receive a packet of uniquely-addressed information on a frequency determined, at least in part, by the time base information and the frequency hoping schedule.

15. The wireless field sensing network of claim 14, wherein the target device comprises a selection from a group consisting of temperature sensor, pressure sensor, and vibration sensor.

16. The wireless field sensing network of claim 15, wherein the packet of uniquely-addressed information comprises at least a portion of an instruction for the target device to report sensing information to the transmitting device.

17. The wireless field sensing network of claim 14, wherein the sequence of frequencies comprises 53 channels comprised by a range of frequencies from about 902 MHz to about 928 MHz.

18. The wireless field sensing network of claim 14, wherein the field sensing network comprises an industrial sensing network.

* * * * *